(12) United States Patent
Kuelbs et al.

(10) Patent No.: US 6,954,734 B1
(45) Date of Patent: Oct. 11, 2005

(54) METHOD OF PRODUCING, SELLING, AND DISTRIBUTING ARTICLES OF MANUFACTURE

(75) Inventors: John A. Kuelbs, Southlake, TX (US); Gregory G. Kuelbs, Keller, TX (US); Gustav P. Kuelbs, Dallas, TX (US)

(73) Assignee: World Factory, Inc., Coppell, TX (US)

( * ) Notice: Subject to any disclaimer, the term of this patent is extended or adjusted under 35 U.S.C. 154(b) by 257 days.

(21) Appl. No.: 09/619,947

(22) Filed: Jul. 20, 2000

Related U.S. Application Data

(60) Provisional application No. 60/149,011, filed on Aug. 13, 1999, and provisional application No. 60/144,682, filed on Jul. 20, 1999.

(51) Int. Cl.[7] .............................................. G06F 17/60
(52) U.S. Cl. ............................ 705/26; 705/20; 705/27; 705/22; 705/28; 705/6; 705/7
(58) Field of Search .............................. 705/26, 27, 22, 705/28, 7, 11, 20

(56) References Cited

U.S. PATENT DOCUMENTS

| | | | | |
|---|---|---|---|---|
| 5,765,143 A | * | 6/1998 | Sheldon et al. | 705/28 |
| 5,794,219 A | * | 8/1998 | Brown | 705/37 |
| 5,953,707 A | * | 9/1999 | Huang et al. | 705/10 |
| 6,049,778 A | * | 4/2000 | Walker et al. | 705/14 |
| 6,078,897 A | * | 6/2000 | Rubin et al. | 705/14 |
| 6,101,484 A | * | 8/2000 | Halbert et al. | 705/26 |
| 6,151,588 A | * | 11/2000 | Tozzoli et al. | 705/37 |
| 6,260,024 B1 | * | 7/2001 | Shkedy | 705/37 |
| 6,269,343 B1 | * | 7/2001 | Pallakoff | 705/26 |
| 6,418,415 B1 | * | 7/2002 | Walker et al. | 705/26 |
| 6,584,451 B1 | * | 6/2003 | Shoham et al. | 705/37 |

FOREIGN PATENT DOCUMENTS

| | | | | |
|---|---|---|---|---|
| EP | 0845747 | * | 11/1997 | G06F/17/60 |
| WO | WO 01/79961 A2 | * | 10/2001 | |

OTHER PUBLICATIONS

Duke, Charles, Matching appropriate pricing strategy with markets and objectives, 1994, The Journal of prodcut and brand management.*

(Continued)

*Primary Examiner*—Mark Fadok
(74) *Attorney, Agent, or Firm*—Hill & Hunn LLP

(57) ABSTRACT

A method of selling articles of manufacture which utilizes an electronic communication system to identify a plurality of articles of manufacture, from a plurality of manufacturing entities, which are available for purchase by said plurality of potential purchasers. The steps of the method include: Identifying pricing milestones in each of (1) a manufacturing phase and (2) a distribution phase, which correspond to an increase in commercial risk. Determining a separate price for each of said pricing milestones to establish a range of prices for said selected ones of said plurality of articles of manufacture, taking into account a change in said commercial risk as said pricing milestones are experienced. Making conditional offers for sale to potential purchasers at each of the pricing milestones, with the conditional offers specifying at least a minimum number of articles which must be ordered in aggregate before the conditional offer becomes binding upon a manufacturing entity. Communicating with potential purchasers and aggregating commercial commitments from potential purchasers for each pricing milestones and thereby selling articles of manufacture. Such that each pricing milestone corresponds to a period of availability in which costs of future supply chain activities or savings related to avoidance of future supply chain activities are reflected in an offer price. The method may also include the use of a trusted intermediary, which may use a virtual exchange.

53 Claims, 16 Drawing Sheets

OTHER PUBLICATIONS

Rajiv, Lal, An approach for developing an optimal discount policy, Management Science, Dec. 1984.*

Bailey, Joseph, An exploritory study of the emerging role of electonic intermediaries, International journal of electronic commerce, 1997.*

Marrinucci, Sandra, Net provers boon for research, Electronic Engineering times, 1997.*

Sairamesh, J. Economic framework for pricing and charging in degital libraries, D–Lib Magazine, 1996.*

* cited by examiner

| DAYS TO DELIVER | COST OF MONEY | RISK OF OBSOLENCE | EXOGENOUS RISK | CURRENCY RISK | FACTORY COST |
|---|---|---|---|---|---|
| N | 10.00 | 0.40 | = | = | = |
| . | 10.00 | 0.00 | > | < | > |
| . | 10.00 | 0.00 | > | < | > |
| 8 | 10.00 | 0.00 | < | < | > |
| 7 | 20.00 | 0.00 | < | < | > |
| 6 | 20.00 | 0.00 | > | < | > |
| 5 | 20.00 | 0.00 | < | < | > |
| 4 | 30.00 | 0.00 | < | < | > |
| 3 | 30.00 | 0.00 | < | < | > |
| 2 | 30.00 | 0.00 | < | < | > |
| 1 | 30.00 | 0.00 | < | < | > |
| . | . | . | . | . | . |
| N | N | N | N | N | N |

PRICE A (STYLE 1) = MANUFACTURER COST
$+ \left( Y * \dfrac{R}{365} \right)$
$+ P[\text{ITEM RISK}]$
$+ P\left[ \dfrac{\$1000 - 0}{\text{ORDER RISK}} \right]$
R = REAL COST OF MONEY APR
Y = DAYS OF FINANCING

FIG. 17A

| ASTONICA INFO GARDEN | Product Gallery | Outdoor Furniture | Garden & Lighting | Prem |
|---|---|---|---|---|
| | Favorites | Indoor Decor | Hearth & A&Q | Access |

Welcome John Doe!

| | | |
|---|---|---|
| Advanced Search: | 69 Records | Page: 1 of 5 |
| Browse: | << | < | > | >> |
| Product Gallery ▼ | Requery | | |
| Log Out: | Search Results: | | |

| About Supply Chain Pricing: |
| Contact Customer Service: |
| Order Pad: |
| Your Account: |
| Dealer Forum: |
| Testimonials: |
| About Us: |
| Help: |
| FAQ's: |

| | | Price | Quantity Available | Time to Delivery | Offer Expires | Order Minimum |
|---|---|---|---|---|---|---|
| 3/PCS SET CASTLE HARDWOOD PLANTER | ⚙ | ~~$61.99~~ | – | – | Closed: 3/9/2000 | 4 |
| | 🚢 | ~~$68.19~~ | – | – | Closed: 6/24/2000 | 4 |
| | 🚛 | $76.37 | 28 | 3–7 days | 9/23/2000 | 1 |

| | | Price | Quantity Available | Time to Delivery | Offer Expires | Order Minimum |
|---|---|---|---|---|---|---|
| 2 TIER ROUND PLANT STAND | ⚙ | ~~$16.29~~ | – | – | Closed: 4/9/2000 | 4 |
| | 🚢 | ~~$17.92~~ | – | – | Closed: 6/22/2000 | 4 |
| | 🚛 | $20.07 | 3 | 3–7 days | 9/21/2000 | 1 |

| | | Price | Quantity Available | Time to Delivery | Offer Expires | Order Minimum |
|---|---|---|---|---|---|---|
| SLAT STYLE BENCH | ⚙ | ~~$74.38~~ | – | – | Closed: 3/9/2000 | 4 |
| | 🚢 | ~~$81.82~~ | – | – | Closed: 6/13/2000 | 4 |
| | 🚛 | $91.64 | 2 | 2–7 days | 9/12/2000 | 1 |

| | | Price | Quantity Available | Time to Delivery | Offer Expires | Order Minimum |
|---|---|---|---|---|---|---|
| ORCHID ROUND TABLE | ⚙ | ~~$69.90~~ | – | – | Closed: 3/9/2000 | 4 |
| | 🚢 | ~~$76.80~~ | – | – | Closed: 6/13/2000 | 4 |
| | 🚛 | $86.12 | 9 | 3–7 days | 9/12/2000 | 1 |

| | | Price | Quantity Available | Time to Delivery | Offer Expires | Order Minimum | |
|---|---|---|---|---|---|---|---|
| ORCHID ARMCHAIR | ⚙ | ~~$11.50~~ | – | – | Closed: 3/9/2000 | 4 | |
| | 🚢 | ~~$15.65~~ | – | – | Closed: 6/13/2000 | 4 | |
| | 🚚 | $51.13 | 9 | 3–7 days | 9/12/2000 | 2 | |

| | | Price | Quantity Available | Time to Delivery | Offer Expires | Order Minimum | |
|---|---|---|---|---|---|---|---|
| ORCHID BENCH | ⚙ | ~~$82.06~~ | – | – | Closed: 3/9/2000 | 4 | |
| | 🚢 | ~~$90.27~~ | – | – | Closed: 6/13/2000 | 4 | |
| | 🚚 | $101.10 | 9 | 3–7 days | 9/12/2000 | 1 | |

| | | Price | Quantity Available | Time to Delivery | Offer Expires | Order Minimum | |
|---|---|---|---|---|---|---|---|
| 5/PCS ROSE ALUMINUM GARDEN SET | ⚙ | ~~$202.99~~ | – | – | Closed: 3/9/2000 | 4 | |
| | 🚢 | ~~$223.29~~ | – | – | Closed: 6/13/2000 | 4 | |
| | 🚚 | $250.08 | 2 | 3–7 days | 9/12/2000 | 2 | |

| | | Price | Quantity Available | Time to Delivery | Offer Expires | Order Minimum | |
|---|---|---|---|---|---|---|---|
| ROSE VINE MATCHING BENCH | ⚙ | ~~$63.89~~ | – | – | Closed: 3/9/2000 | 4 | |
| | 🚢 | ~~$70.26~~ | – | – | Closed: 6/3/2000 | 4 | |
| | 🚚 | $78.71 | 3 | 3–7 days | 9/2/2000 | 1 | |

| | | Price | Quantity Available | Time to Delivery | Offer Expires | Order Minimum | |
|---|---|---|---|---|---|---|---|
| 5/PCS IMPERIAL CAST GARDEN SET | ⚙ | ~~$221.99~~ | – | – | Closed: 3/9/2000 | 4 | |
| | 🚢 | ~~$244.19~~ | – | – | Closed: 6/13/2000 | 4 | |
| | 🚚 | ~~$273.49~~ | – | – | Closed: 9/12/2000 | 4 | SOLD |

| | | Price | Quantity Available | Time to Delivery | Offer Expires | Order Minimum | |
|---|---|---|---|---|---|---|---|
| 5/PCS SELECT CAST GARDEN SET | ⚙ | $221.99 | – | – | Closed: 3/9/2000 | 4 | |
| | 🚢 | $244.19 | – | – | Closed: 6/13/2000 | 4 | |
| | 🚚 | $273.49 | 9 | 3–7 days | 9/12/2000 | 1 | |

| | | Price | Quantity Available | Time to Delivery | Offer Expires | Order Minimum | |
|---|---|---|---|---|---|---|---|
| 5/PCS ALUMINUM & WICKER PATIO SET | 🚚 | $221.72 | 10 | 3–7 days | 6/30/2000 | 1 | |

| | | Price | Quantity Available | Time to Delivery | Offer Expires | Order Minimum | |
|---|---|---|---|---|---|---|---|
| WICKER & ALUMINUM BISTRO SET | ⚙ | $74.05 | – | – | Closed: 3/9/2000 | 4 | |
| | 🚢 | $81.46 | – | – | Closed: 4/26/2000 | 4 | |
| | 🚚 | $91.23 | 3 | 3–7 days | 7/30/2000 | 1 | |

| | | Price | Quantity Available | Time to Delivery | Offer Expires | Order Minimum | |
|---|---|---|---|---|---|---|---|
| 3/PCS ALUMINUM AND WICKER BISTRO SET | 🚚 | $119.87 | – | – | Closed: 9/26/2000 | 4 | SOLD |

| | | Price | Quantity Available | Time to Delivery | Offer Expires | Order Minimum | |
|---|---|---|---|---|---|---|---|
| 7-1/2', 6 RIB STANDARD UMBRELLA HUNTER GREEN | ⚙ | $27.76 | – | – | Closed: 3/9/2000 | 4 | |
| | 🚢 | $30.54 | – | – | Closed: 6/13/2000 | 4 | |
| | 🚚 | $34.20 | – | – | Closed: 9/12/2000 | 4 | SOLD |

| | | Price | Quantity Available | Time to Delivery | Offer Expires | Order Minimum | |
|---|---|---|---|---|---|---|---|
| 7-1/2', 6 RIB STANDARD UMBRELLA BLUE | ⚙ | $27.76 | – | – | Closed: 3/9/2000 | 4 | |
| | 🚢 | $30.54 | – | – | Closed: 6/13/2000 | 4 | |
| | 🚚 | $34.20 | – | – | Closed: 9/12/2000 | 4 | SOLD |

RETAILER TO SOURCE
OLD SOURCING METHOD
EACH PRODUCT CATAGORY HAS ITS OWN UNIQUE PATH TO SUPPLY WHICH
MAKES IT DIFFICULT FOR INDEPENDENT RETAILERS TO SOURCE A VARIETY OF GOODS

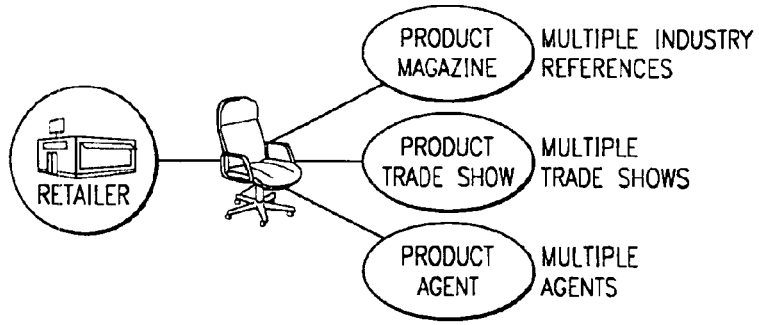

EXCHANGE RETAILERS ENJOY A "SINGLE POINT OF CONTACT" TO
MULTIPLE PRODUCT CATAGORIES AND MULTIPLE FACTORIES

THE EXCHANGE EMPOWERS INDEPENDENT RETAILER PURCHASING PERSONNEL
INDEPENDENTS CAN NOW COMPETE IN BOTH
PRICE AND SELECTION WITH NATIONAL CHAINS

*FIG. 18C*

PHYSICAL FLOW OF GOODS
THE OLD SYSTEM
UP TO 5 SHIPPING TRANSACTIONS AND UP TO 3 WAREHOUSE STOPS

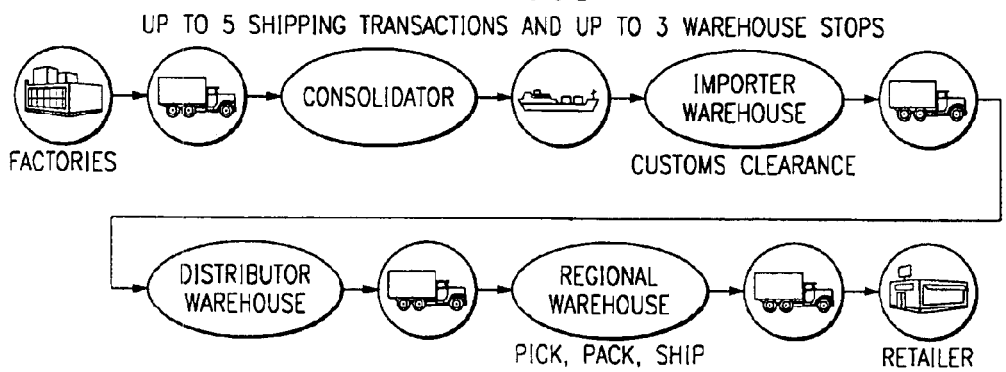

THE NEW SYSTEM
1 OR 0 WAREHOUSE STOPS

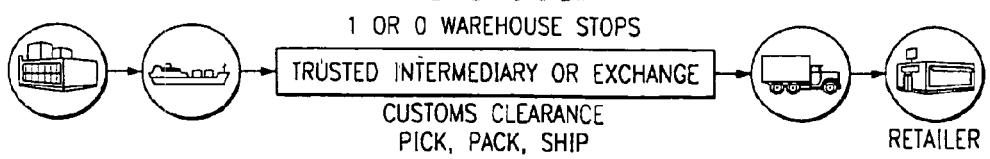

*FIG. 18D*

METHOD OF PRODUCING, SELLING, AND DISTRIBUTING ARTICLES OF MANUFACTURE

CLAIM OF PRIORITY

The present application claims the benefit of priority under 35 USC Section 119 to the following two provisional patent applications:

(1) U.S. patent application Ser. No. 60/144,682, Filed 20 Jul. 1999, entitled "Supply Chain Pricing";

(2) U.S. patent application Ser. No. 60/149,011, Filed 13 Aug. 1999, entitled "Method of Producing, Selling and Distributing Articles of Manufacture."

BACKGROUND OF THE INVENTION

1. Field of the Invention

The present invention relates in general to techniques for producing, selling, and distributing articles of manufacture which is especially well suited for nonperishable articles but which could find applicability to perishable manufactured articles as well.

2. Description of the Prior Art

At present, the manufacturers of non-perishable goods have obtained enormous economic and commercial advantage by having the non-perishable goods manufactured in remote locations, where economic, legal, regulatory, and labor conditions are favorable to manufacturers, resulting in relatively lower costs than can be obtained in other production markets. One primary example of this phenomenon is the increasing importance of The Peoples Republic of China and other less-developed Asian countries for the production of non-perishable consumer goods which are shipped to, and consumed by, first-world economies such as the United States, Canada, and Western Europe. The strong preference for this remote, third-world manufacturing is a primary factor for trade imbalances which exist between the United States and China. The consumer in the first world eventually benefits from this manufacturing scenario, but the immediate and primary benefit goes to the producers, distributors, and retailers of the nonperishable goods. As the product choices available to the consumer expand, consumers will typically begin viewing particular non-perishable goods as commodities. For example, television sets, stereo equipment, and computers are in large part viewed by most consumers as commodity items, and consumers are accordingly quite price sensitive. This is typically only true after the novelty of a particular item no longer commands a premium, and as competitive items are offered which include the desirable product features and functions.

Under this conventional manufacturing, sales, and distribution scenario, the consumer may or may not benefit from the relative advantages of the low cost of manufacturing the nonperishable goods; to the extent that the consumer does benefit, it is usually late in the product life, with the greatest consumer advantage typically being obtained as newer models or versions of the non-perishable goods are "rolled out" in order to replace older versions. In other words, the greatest economic advantage can be derived by the consumer by buying the non-perishable articles as they are being obsoleted by other products and newer versions of the same product. Many consumers are aware of this fact, and tend to purchase expensive items such as automobiles, computers, and the like, at the end of a product's life cycle in order to obtain the best commercial terms.

Additionally, under conventional sales and distribution techniques, relatively hefty margins are required for the non-perishable articles in order to take into account the time value of the capital which is "tied up" in products in the supply chain. Additionally, conventional distribution systems require a significant number of product units in order to fill a supply chain at all levels including the distribution level and the retail level. Of course, there is great danger for the manufacturer insofar as it may over-estimate demand and thus over-produce products which results in an "overshoot" condition which generally results in steep discounting toward the end of the product life in order to deal with the "remainder" of the products which have not been sold. For example, this is a non-trivial aspect of book publishing, wherein remainder aftermarkets are robust and are noteworthy for the steep (and sometimes below cost) discounting which must occur in order to deplete remaining inventory. Conversely, should the manufacturer underestimate the product acceptance and/or product demand, it generates an "under-shoot" condition, wherein there is not enough product to fill the supply chain and demand goes either unmet or is deferred until additional production runs can refill the supply chain. This is an undesirable condition insofar as fickle consumers may lose interest in a product before additional production runs are completed and product delivered to the retail outlets, or competitors may move in to fill the demand which can not be met for the product. Additionally, it is undesirable insofar as a series of successive production runs is inherently less efficient than a smaller number of large production runs, which results in an increase in the cost of goods sold and typically manifests itself as an increase in price or a reduction in profits. As a result of these factors and considerations, most manufacturers, wholesalers, and retailers follow a simple pricing plan in which new products are introduced at an initial price which is, in some cases, the highest price that will ever be charged for the product, and proceed to repeatedly discount the price in order to deplete supply. Of course, this approach severely punishes those consumers who are "early adopters" or early purchasers of products, and can result in pricing strategies which are so aggressive that consumer interest and demand is essentially squelched before it can begin.

Additionally, in conventional commerce, goods that are manufactured off-shore are placed in intermodal containers and are transported (by combinations of air, boat, rail, and surface transport such as trucks) to warehouses where the containers are broken down and products are routed to wholesale distribution centers which further break down the products and deliver them to retail outlets. Again, in the allocation and distribution of products there can occur serious "over-shoot" and "under-shoot" conditions. An overshoot condition is represented by the relative over supplying of products to any particular geographic region or commercial channel of trade. Conversely, an under-shoot condition is the disproportionate allocation of products which results in insufficient products in any particular geographic region or channel of trade. These distributions over-shoot and under-shoot scenarios are expensive to remedy since they require the repackaging and reshipping of product to different geographic lacations or different channels of trade. Frequently, there are ancillary paperwork and accounting actions which must be performed in parallel with the decision making and transfer process. Of course, sales may be lost and consumers may be frustrating during such reallocation or reshuffling operations, or better organized and/or agile competitors may move in to fill the demand.

SUMMARY OF THE PRESENT INVENTION

It is one objective of the present invention to allow the consumers of articles of manufacture to directly, immediately, and personally enjoy the commercial advantages derived from the manufacture of such articles in remote locations which have favorable manufacturing conditions.

It is another objective of the present invention to provide a method of manufacturing, selling, and distributing products which financially rewards early adopters or early buyers of products with the lowest price, and which provides a disincentive to the later adopters or purchasers with a price which increases generally as the risk and/or cost increases to the manufacturer. In other words, those customers that commit prior to production or early in the production cycle will receive the best price because the manufacturer has accepted less risk and incurred less cost. The early adopters or purchasers are, in effect, sharing risk with the manufacturer. In contrast, the later adopters or purchasers are charged a higher price because the manufacturer has experienced an increasing amount of risk and committed capital as the products are designed, manufactured, packaged, transported, delivered to warehouses, and further distributed through wholesale or retail channels of commerce. The present invention is well suited for the sale of goods to the end users (a business-to-consumer application) and to resellers (a business-to-business application). In the case of business-to-consumer sales, the approach of the present invention is diametrically opposed to current conventional methods of production, sales, and distribution of products. In a business-to-business application, the enables small and mid-size buyers (defined as buyers of quantities of goods that are less than a production minimum) to directly drive make/not make production decisions at the manufacturing point. The enhancement organizes and enables small buyers to collectively exercise demand response at the pre-production and production stages, far earlier and with less intermediation than possible previously, resulting in economic advantage to the buyers.

Viewed in economic terms the present invention can be characterized in basic economic concepts. Conventionally, fixed costs are usually amortized over a number of items produced (or sold), which results in a price reduction as volumes increase and fixed costs are increasingly recovered. In perfectly competitive markets, the movement of commodity price theoretically and in practice generally moves down the average unit cost curve to price equilibrium (i.e., the lowest price for the consumer that is sustainable by the manufacturer) at the marginal unit cost. The present invention recognizes and rewards the qualitative difference (in terms of risk deferral) at an individual buyer level of "early adopters (or demanders)" in their enabling a manufacturer (or "inventory risk taker") to enter the market in the first place.

In the preferred, but not exclusive, implementation of the present invention, the product price increases at the key points in the life-cycle of the product. For example, certain natural milestones in a product development can correspond to an upward step increase in price, and some exemplary milestones include: product design, pre-production, production, container-loading, in-transit, in-warehouse, in-distribution, and in-stock.

It is another objective of the present invention to provide a method whereby "markets" for a given commodity or article can be made at key (risk) points in the life-cycle of a commodity (i.e., from drawing board, to pre-production, to producing, to "in-transit" status, to available for sale). The formation of the "market" at each point requires an electronically-enabled means of aggregating qualified buyers, identification and qualification of a manufactured product or manufacturers willing to guarantee manufacture, and the electronic, simultaneous mass presentation of certain information (e.g., product specifications, delivery date, terms and quantities) which varies from stage to stage, to all buyer participants.

It is another objective of this invention to reduce the risk of loss to the manufacturer through rewards to early adopters or early purchasers, to minimize production over-shoots and production under-shoots, and to minimize distribution over-shoots or distribution under-shoots. Furthermore, it allows a producer or manufacturer to utilize the capital (from prepayments) of its customers in order to finance the design, mass production, packaging, shipping, routing, and delivery of the goods.

It is another objective of the present invention to provide a method of packaging and delivering goods which reduces significantly shipping and handling costs by allowing the manufacturer to take responsibility for certain packaging, labeling, sorting, and container packaging decisions, which collectively allow the manufacturer to perform many steps or tasks which were previously performed by delivery companies in the geographic location of the consumers of the nonperishable goods. As a consequence, producers will be able to negotiate the lowest possible shipping and handling charges with commercial shippers and delivery services such as FedEx, UPS, USPS, and the like.

In alternative embodiments, the present invention may be utilized for the selling and distribution of commodities and perishable processed goods or perishable articles of manufacture.

DESCRIPTION OF THE DRAWINGS

FIGS. 17A, 17B and 17C are exemplary internet graphical user interfaces in accordance with another embodiment of the present invention, presenting an array of different products.

FIGS. 18A through 18F are graphical representations of the numerous advantages which are obtained through implementation of the present invention.

DETAILED DESCRIPTION OF THE INVENTION

Figure 1:
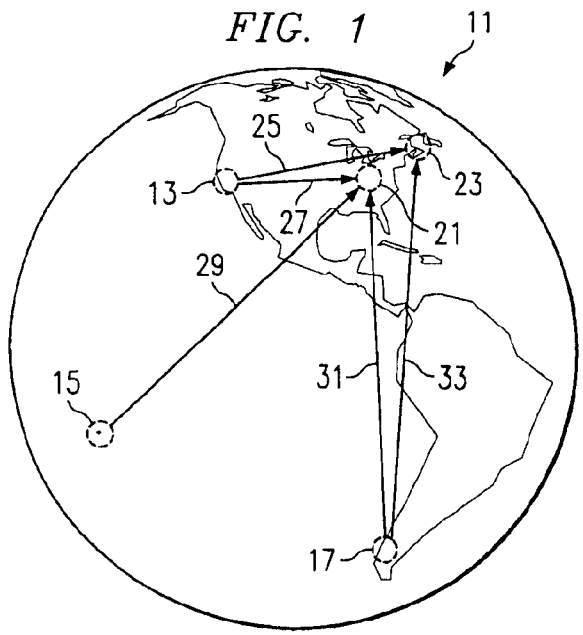
FIG. 1 is a simplified pictorial representation of relatively separated geographic regions for the production of commodities, nonperishable goods, or articles of manufacture and for the consumption of such goods.

FIG. 1 is a simplified and symbolic representation of the manufacture, transportation, and delivery of nonperishable goods, processed commodities, or articles of manufacture between production sites and consumption sites. More specifically, earth 11 includes a number of production locations 13, 15, 17 which have local economic, legal, regulatory, and other conditions which are favorable for the mass production of nonperishable consumer goods. More particularly, nonperishable goods may be manufactured on a large scale at a relatively low cost per item. A plurality of relatively remote consumption locations 21, 23 are also provided which are relatively good markets for the sale of such nonperishable consumer goods. For example, consumption locations 21, 23 may comprise North America and Western Europe. A plurality of relatively well established export/import transport pathways 25, 27, 29, 31 and 33 are provided between the production locations 13, 15, 17, and the consumption locations 21, 23. The export/import transport path typically comprises an intermodal transport path in which goods are packed into a standard shipping container and transported by sea, air, rail, or ground transport, or combinations of those transport methodologies. It is one objective of the preset invention to allow consumers located in consumption locations 21, 23 to personally, directly, and immediately realize the commercial advantages which have heretofore been realized principally by the producer of goods, provided that the consumers of consumption locations 21, 23 make concrete and early financial commitments to the producer or manufacturer which are financially advantageous for the producer or manufacturer.

Figure 2:
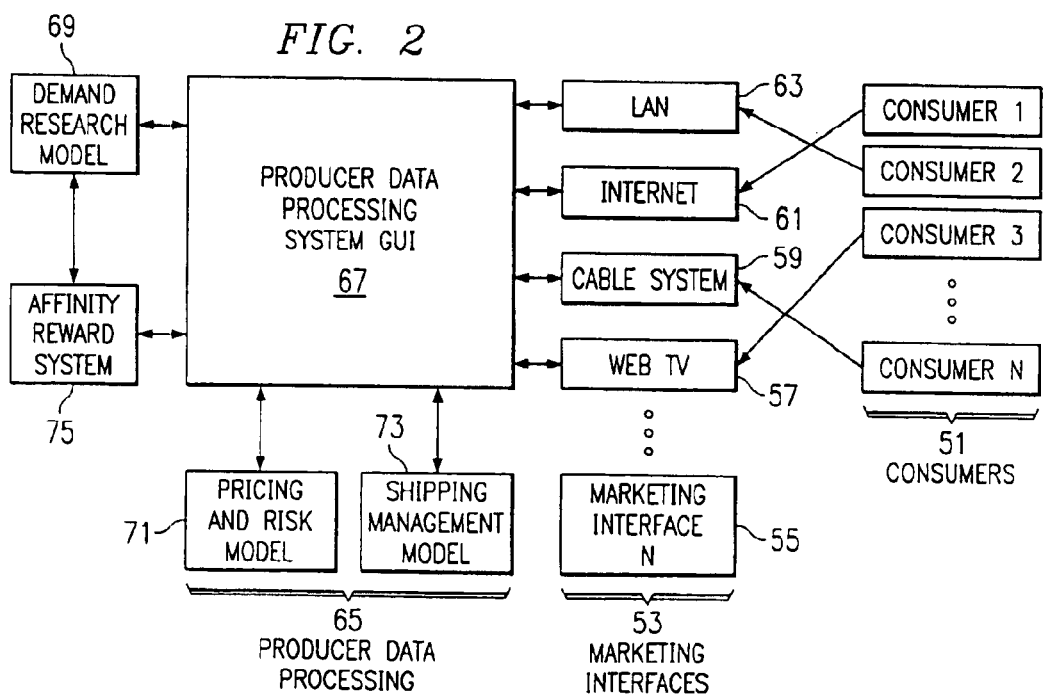
FIG. 2 is a simplified block diagram representation of an exemplary producer data processing system and an exemplary marketing interface which may be accessed by consumers in order to evaluate and/or consummate transactions.

FIG. 2 is a block diagram representation of the producer data processing system 65, alternative and potential marketing interfaces 53, and consumers 51. As is shown, the producer data processing system 65 includes a producer data processing system graphical user interface 67. Additionally, the producer data processing system 65 includes a demand research model 69 which is utilized in order to determine potential consumer demand for particular proposed nonperishable consumer goods, prior to pre-production production activities. Preferably, but not necessarily, an affinity reward system 75 is coupled to the demand research model 69. The demand research model is an attractive but nonessential portion of the present invention since goods can be offered for sale with little or no research, especially if the goods are conventional in nature. The same is true for the affinity reward system. When present, both the demand research model 69 and the affinity reward system 75 are embodied in executable data processing instructions, and are preferably modular in construction.

The producer data processing system graphical user interface 67 preferably comprises a series of cascading graphical user interface screens, coded in HTML or XML as is conventional, which present customers 51 with a series of instructions, options, and requests for information. It is through the aggregated and collective interaction by consumers 51 with the graphical user interface screens that producer determines what particular proposed products are likely to be well received by consumers 51. Additionally, it is through use of the cascading graphical user interface screens that consumers 51 interact with the modular price and risk model 71 which is preferably embodied in a series of executable data processing instructions, and which provide a mathematical and predetermined frame work for fixing the price of one or many nonperishable consumer goods, in accordance with the particular timing of the customer purchase of a particular product. In general, earlier customer commitments will result in lower product prices, while later customer commitments will result in higher product prices. In this manner, customers that are "early adopters" or early buyers and make financial commitments to purchase products early in the production cycle will receive the best possible price, and thus will realize the considerable economic advantages of the remote manufacture of the goods. Conversely, those customers which make financial commitments to purchase particular products late in the production cycle will receive a relatively higher price which reflects the amount of risk and the costs which has been absorbed or incurred by the producer up to that point in time. A model typically is constructed based upon the timing and relative increases in risk over time as a product is proposed, placed in pre-production, mass produced, packaged, shipped, and delivered. If a customer makes a financial commitment early in the supply chain cycle of a particular product, he or she will receive the best possible price.

Viewed in economic terms the present invention can be characterized in basic economic concepts. Conventionally, fixed costs are usually amortized over a number of items produced (or sold), which results in a price reduction as volumes increase and fixed costs are increasingly recovered. In perfectly competitive markets, the movement of commodity price theoretically and in practice generally moves down the average unit cost curve to price equilibrium (i.e., the lowest price for the consumer that is sustainable by the manufacturer) at the marginal unit cost. The present invention recognizes and rewards the qualitative difference (in terms of risk deferral) at an individual buyer level of "early adopters (or demanders)" in their enabling a manufacturer (or "inventory risk taker") to enter the market in the first place, without the participation of intermediary resellers in the supply chain.

In the preferred implementation of the present invention, the price increases at the key points in the life-cycle of a product. For example, certain natural milestones in a product development can correspond to an upward step increase in price, and some exemplary milestones include: product design, pre-production, production, container-loading, in-transit, in-warehouse, in-distribution, and in-store.

It is another objective of the present invention to provide a method whereby "markets" for a given commodity or article can be made at key (risk) points in the life-cycle of a commodity (i.e., from drawing board, to pre-production, to producing, to "in-transit" status, to available for sale). The formation of the "market" at each point requires an electronically-enabled means of aggregating qualified buyers, identification and qualification of a manufactured product or manufacturer willing to guarantee manufacture, and the electronic, simultaneous mass presentation of certain information (e.g., product specifications, delivery date, terms and quantities) which varies from stage to stage, to all buyer participants.

As is depicted in FIG. 2, and in accordance with the preferred embodiment of the present invention, the interaction between the producer data processing system 65 and consumers 51 is conducted in a semi automated fashion. This is important because it reduces the overall transaction costs associated with the interaction between a plurality of consumers 51 and the producer's data processing system 65 which may present one or many particular products. In the event that a producer is offering thousands or tens of thousands of products, the transaction costs associated with the soliciting, receiving, and recording of financial commitments can be considerable. It is through the utilization of computer-executable instructions that such a complex interaction of aggregated point-to-point communication between consumers and producers is made commercially feasible. A plurality of alternative marketing interfaces are depicted in block diagram form in FIG. 2. These include a local area network 63 which may require dial-up by consumers 51 in order to gain access to producer data processing system 65. The utilization of local area network 63 may also require the consumers 51 to utilize pass words which are assigned to them. An alternative marketing interface 53 is utilization of the Internet 61 in order to communicate in an electronically moderated fashion with the producer of data processing system 65. An alternative system would comprise a cable system 59 with a set-top box. As telecommunication functions are being shifted from land lines over to coaxial cable systems, it is likely that significant commercial interaction between consumers and sellers of goods will occur utilizing interactive television with a cable connection. One particular embodiment of an intelligent television system is the utilization of Web TV 57 as an interface between consumers 51 and producer data processing system 65. "Web TV" is a set-top box which allows for simultaneous access to television program and the Internet in order to allow each media to supplement the other.

Figure 3A:
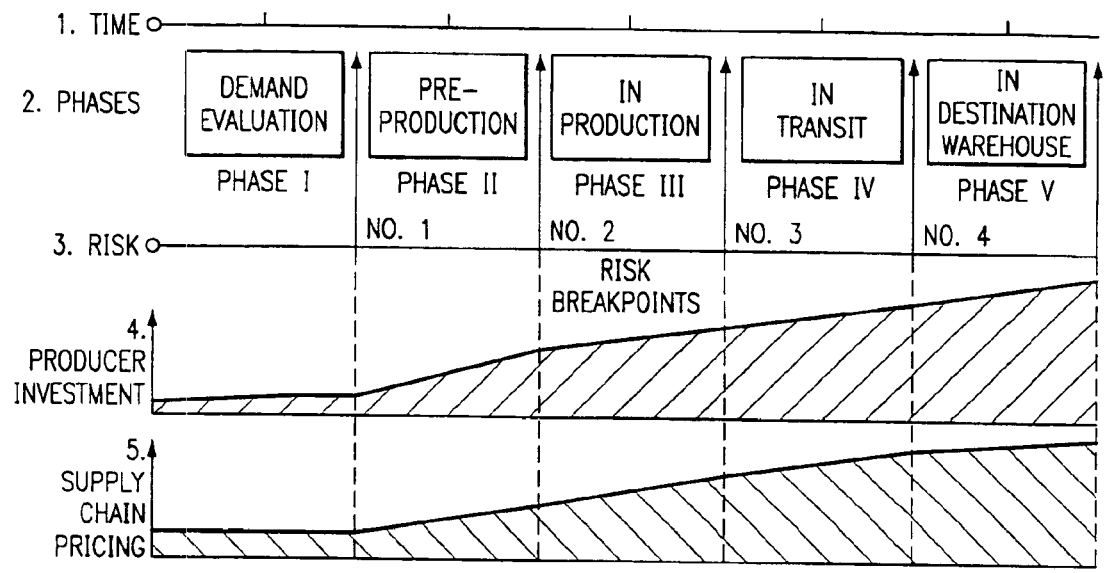
FIG. 3A is a simplified graphical representation of various phases of production, risk breakpoints, producer investment (or risk) and the advantageous supply chain pricing which may be accomplished utilizing the present invention, all with respect to a common time axis.
Figure 3B:
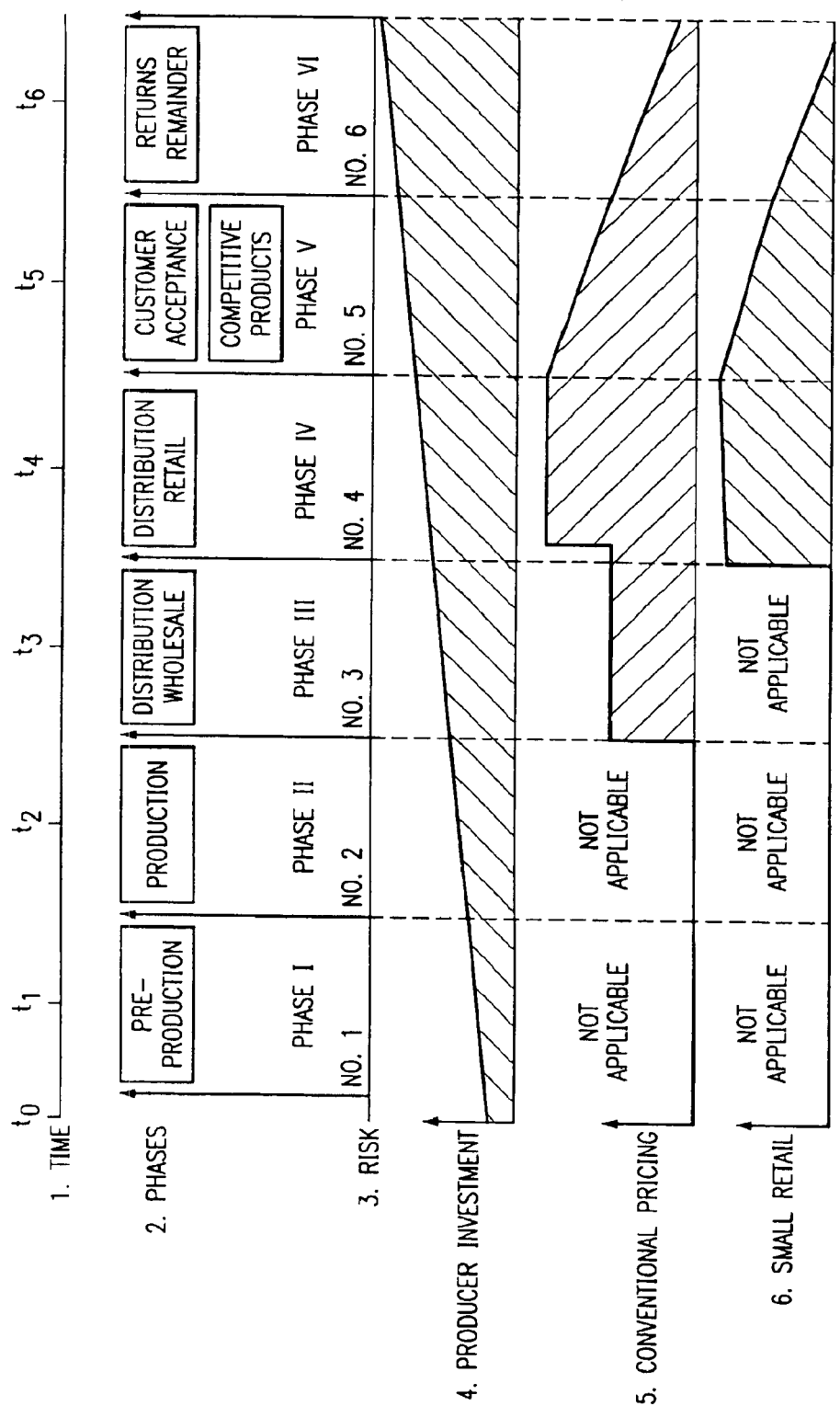
FIG. 3B is a graphical representation of the conventional prior art approach, and provides a graphical contrast with the approach of FIG. 3A.

FIGS. 3A and 3B are contrasting graphical representations of the preferred implementation of the present invention and the conventional implementation of the prior art. FIG. 3A is representative of the present invention, while FIG. 3B is representative of the prior art. A plurality of graphs are depicted which represent time, production phases, risk, producer investment, and pricing. With reference first to FIG. 3A, at time t1 the producer is utilizing the demand research model 69 of FIG. 2 in order to determine potential demand for a proposed product. In many instances, the proposed product has been produced before and the "offer" relates to a proposed production run. In other instances, the offering may constitute the creation of a actual or "virtual" prototype of the product, product specification, and preliminary price data. At this point in time, the producers risk is low or de minimus, and its investment is relatively modest, consisting of the pictorial, graphical, and other information necessary to present proposed products, without having actually produced the products. In accordance with the preferred embodiment of the preset invention, potential customers are encouraged to express their level of interest in the proposed product and rewarded through the related affinity reward system 75 of FIG. 2.

As the producer moves from demand evaluation to pre-production activity, in time interval t2, the producer begins making concrete financial commitments to the product which are illustrated as an increase in the producer investment in the view of FIG. 3A. Such producer investment includes the cost of engineering, testing, manufacturing molds or other equipment utilized for mass production, and similar capital investment. During the end-production phase of time interval t3 additional considerable producer investments are made in the product. These include the costs of acquiring parts, raw materials, and the like, as well as the costs of engaging one or more factories to tool-up for mass production operations, and any corresponding financial commitments which are required by the manufacturer. During the fourth phase, a product which has been produced and placed in containers for transport from a producing location to a consuming location. Transport typically includes intermodal transport by land, sea, air, or rail. The producers investment further increases during this phase of time interval t4. The cost items include the cost of transportation and insurance. In the time interval of t5, product is placed in a destination warehouse for further distribution to retail outlets. Again, another risk threshold is crossed and the producer makes additional investments in the product, principally in the form of the time value of capital tied up in inventory in the warehouses and distribution channels.

For each one of phase I through V, the producer has an increasing capital investment in the product. It is one objective of the present invention to have a price model which generates a price for each unit of product which increases in general correspondence with the increased investment, and corresponding risk that the producer has in the particular product. This is depicted in the fifth graph of FIG. 3A.

As is shown, during Phase I, the customer is allowed to purchase the product at the lowest possible price. This corresponds to the producer's investment in the product which is essentially de minimus at this point. During Phase II, once pre-production activities have commenced, the producer has an increasing investment in the product, so the price which is generated by the price model for the customer increases in general correspondence thereto. As one can see from the graphs of FIG. 3A, a customer that makes a commitment during Phase I obtains a better price than a customer that makes a commitment during Phase II. During Phase III, the producer's investment in the product (and corresponding risk) further increases, and so does the price which is generated by the price model and which is made available to the customer. As the goods are loaded into containers for intermodal transport, during Phase IV, the customer may obtain the product at a still higher price, which also generally corresponds to an increase in the producer's investment in the product. During Phase V, when the product has been received at a destination warehouse, the producer's investment (and corresponding risks) is still higher, so the price model of the present invention generates a price which generally corresponds to this increased investment. FIG. 3A provides a simplified, but graphically, representation of a significant advantage accomplished utilizing the present invention, which is to have a better correspondence between the price charged to the end customer and the actual investment, cost, or risk incurred by the producer. This can be better understood by contrasting the graphs of FIG. 3A with the graphs of FIG. 3B, which depict in more conventional pricing strategy.

As is shown in FIG. 3B, six graphs are shown which represent time, phases of production, risk to the producer, the producer investment, and conventional pricing. As is shown in FIG. 3B, it is not conventional to price products to the consumer for the pre-production activities of Phase I or the production activities of Phase II, so there is no pricing data generally available at this point. However, the producer is experiencing real risks and costs as it moves into pre-production, and from preproduction to production. The producer investment is depicted in simplified form as a generally increasing amount. It is only during Phase III (distribution and wholesale) that price is typically announced or made available. At this phase small retailers are not often actively involved principally because wholesale distribution typically requires the purchase of large volumes, and small retailers simply lack the financial strength to make such purchases, and, in fact, small retailers simply could not sell volumes sufficient to justify such large purchases. The net effect is that small retailers are effectively locked out of the wholesale level. This is represented graphically in the six graphs of FIG. 3B.

As is conventional, the wholesale price is a fractional component of the suggested, recommended, or mandated retail price. In many industries retail prices are 100 to 200% of wholesale prices. As is shown, in Phase III, when wholesale distribution begins, a price is associated with the product, but the price is not generally made available to, or known by, the end user. As the product moves from wholesale distribution of Phase III to retail distribution of Phase IV, the price typically increases in a step-function fashion in order to allow the retailer a fair profit margin. During Phase V, the producer is now able to determine customer acceptance of the product. Additionally, competitive products may be available substantially simultaneously. FIG. 3B depicts a situation in which customer acceptance for the new product is not robust, and in which competitive products are available. Typically, this results in a declining price over the duration of Phase V, and into Phase VI which is representative of the returns and remainder after-market. During the remainder after-market activity of Phase VI, the price may be cut substantially, and in fact may be cut below the actual costs of goods sold.

Heretofore, the preset invention has been described with respect to a single product. In fact, the preferred embodiment contemplates simultaneously applying the present invention to a wide array of products. In fact, the present invention is especially well suited for selling a wide array of unrelated nonperishable consumer goods or articles of manufacture. Additionally, the present invention has applicability to the sale of produced or processed perishable goods. For example, processed foods or drinks may be sold utilizing the present invention, especially if the customer is a small business. For example, butter or soft drinks can be presold before production begins to small grocery stores and grocery store chains.

Figure 4:
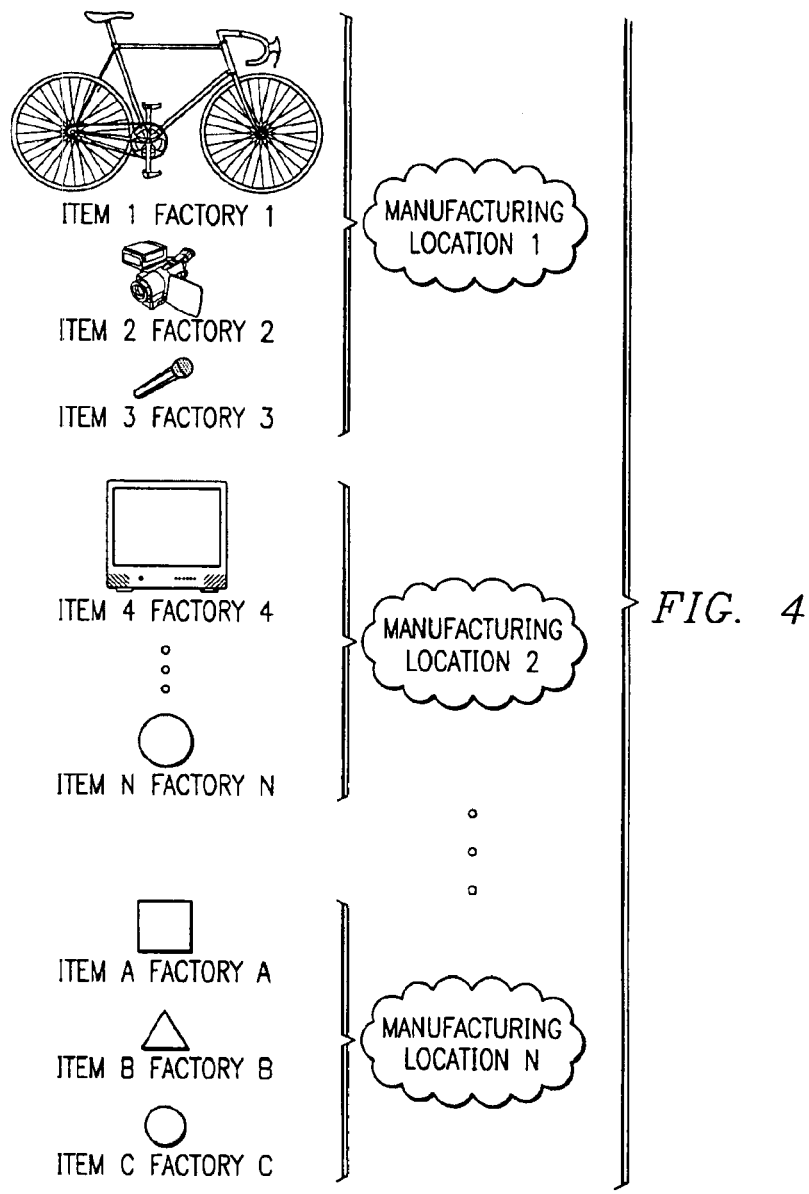
FIG. 4 is a highly symbolic representation of the manufacture of a variety of nonperishable goods or articles of manufacture at a variety of remote manufacturing locations.

FIG. 4 depicts the sale of an array of goods. As is shown, a number of separate manufacturing locations exist, including manufacturing location 1, manufacturing location 2, and manufacturing location N. Each manufacturing location represents a general geographic location in which a plurality of plants or factories are utilized to produce a plurality of disparate, unrelated nonperishable consumer products. For example, at manufacturing location 1, item 1 from factory 1 is a bicycle, while item 2 from factory 2 is a LCD display, and item 3 from factory 3 is a tennis racket. Factories 1, 2, and 3 are generally located proximate to one another, the packaging and shipping operations be consolidated and coordinated in a manner as will be described below. Manufacturing location 2 is located remotely from manufacturing location 1. It includes factory 4 which produces item 4 which is a television and item N from factory N. These factories are physically proximately located justifying a consolidation and coordination of packing and shipping operations. The same is true for factory location N which manufactures item A at factory A, item B at factory B, and item C at factory C. This factory N location is geographically remote from the other factories, but the proximity of factories A, B, and C justify consolidation and coordination of packing and shipping operations.

Figure 5:
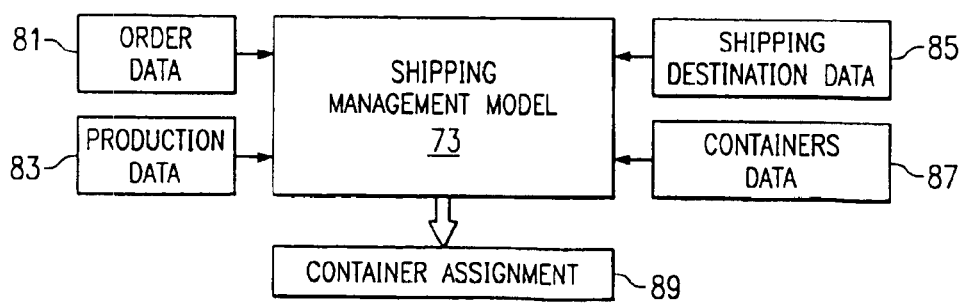
FIG. 5 is a block diagram representation of a shipping management model which is utilized in order to determine container assignment for particular goods.

In accordance with the preferred embodiment of the present invention, the shipping management model 73 of FIG. 2 is utilized to intelligently and dynamically coordinate the packing and shipping of unrelated nonperishable consumer goods. This is depicted in block diagram form in FIG. 5. As is shown, shipping management model 73 receives as an input order data 81 which may comprise product identity number and product option information, production data 83 which may comprise expected completion dates for particular productions runs, the size of the production run, and the like, shipping destination data which may comprise very specific address and other information for the particular consumer placing a particular order, or it alternatively may comprise detailed information about a shipping destination which is a third party facilitator (such as "Mail Boxes Etc." or other similar commercial shipping centers), and container data 87 which may comprise the number, size and current load condition of a plurality of containers which are available presently or which may be available at future dates for the coordinated shipping effort.

The order data 81, production data 83, shipping destination data 85, and container data 87 is passed into shipping management model 73 in order to generate container assignment data 89 which is utilized to fill intermodal shipping containers with the unrelated and disparate nonperishable consumer goods from a number of (perhaps unrelated) factories all located in a particular manufacturing location. The shipping management model 73 is especially useful in efficiently and fully filling each container. This is critical, since the disparate and unrelated nonperishable consumer goods are of different sizes. For example, item 1 of factory 1 is a bicycle which requires a rather large box, while item 2 from factory 2 is an LCD display which is relatively small in comparison. Additionally, item 3 from factory 3 is a tennis racket which requires still different packaging. Each of the products also have particular shipping requirements, due to their fragile or durable nature. Shipping management model 73 takes all this information into account in order data 81 and matches it against the current status of a particular container which is manifest in container data 87. For example, a plurality of containers may be available for the next shipment, with each container having varying degrees of available space. The particular volume of the packaging associated with items 1, 2, and 3 should be taken into account in order to optimally fill the containers in a timely manner without presenting any unnecessary risk of harm to any of the items carried in the particular container.

It is a further requirement of the preset invention that the available containers be dedicated to particular geographic shipping destination regions. In other words, the shipping containers should be utilized to pre-group a plurality of packages which are generally destined for a generally similar geographic location. The advantages of this approach will be clear in the description which follows below. Production data 83 is utilized to ensure that the various product schedules and availability dates for the various items which are available for loading in manufacturing location 1 do not unnecessarily delay product delivery. For example, one would not want to unnecessarily delay the delivery of LCD displays of item 2 from factory 2 because of production delays for the tennis racket of item 3 from factory 3. Accordingly, a greater number of bicycles of item 1, factory 1 may be loaded preferentially in order to prepare one or more containers for timely departure from the docks.

Figure 6:
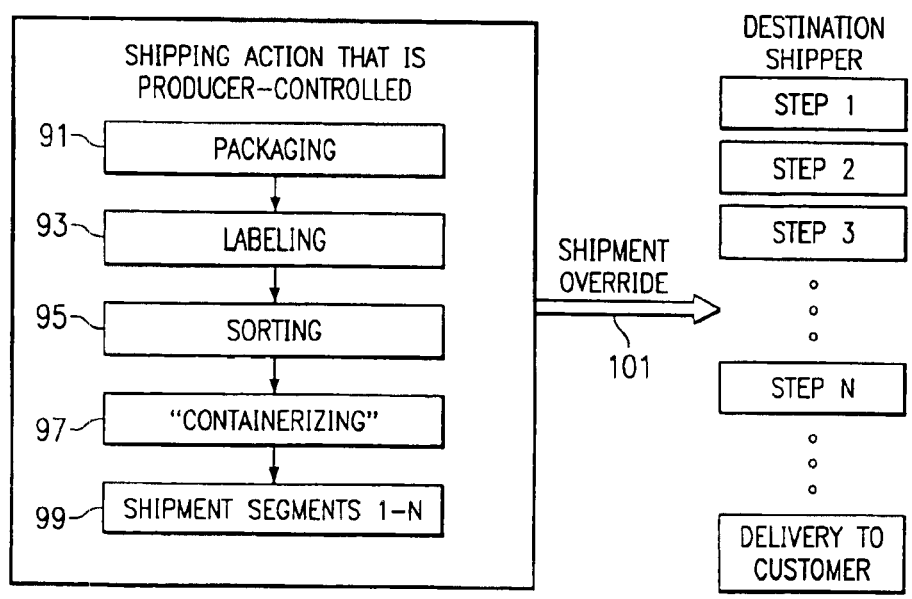
FIG. 6 is a block diagram representation of the interrelationship between shipping actions which are performed by and/or controlled by a producer and the activities performed by and/or controlled by a destination shipper in the region in which the commodities, nonperishable goods, or articles of manufacture are to be delivered.

In the preferred embodiment of the present invention, the producer and third parties under the control and direction of the producer take responsibility for particular shipping actions or activities which have heretofore been left to commercial shippers. This presents a form of "prepackaging, presorting, and prelocating" which has not heretofore been done in the prior art. This is depicted in block diagram form in FIG. 6. As is shown, a plurality of shipping actions are under the control of the producer include packaging step 91, labeling step 93, sorting step 95, "containerizing" step 97 and the determination of shipping segments 1 through N (which will be described in detail below). Collectively, these producer-controlled shipping actions represent a form of shipment override 101 which is superimposed upon the ordinary packing, labeling, containerizing, and shipping actions of third-party commercial shippers in the geographic region of the destination of the nonperishable consumer goods. As is shown, the actions of a destination shipper are depicted in simplified form as steps 1, 2, 3, N, and delivery to customer. The aggressive and proactive shipping actions taken by the producer eliminate, reduce, simplify, or entirely preempt actions which are conventionally taken by the destination shipper. This should present a commercial advantage when utilized properly which will manifest itself in the form of shipping discounts. Commercial shippers such as FedEX, UPS, USPS, and the like will likely enter into contracts which provide preferential shipping rates for items which are prepackaged, labeled, sorted, containerized, and organized by region.

Figure 7:
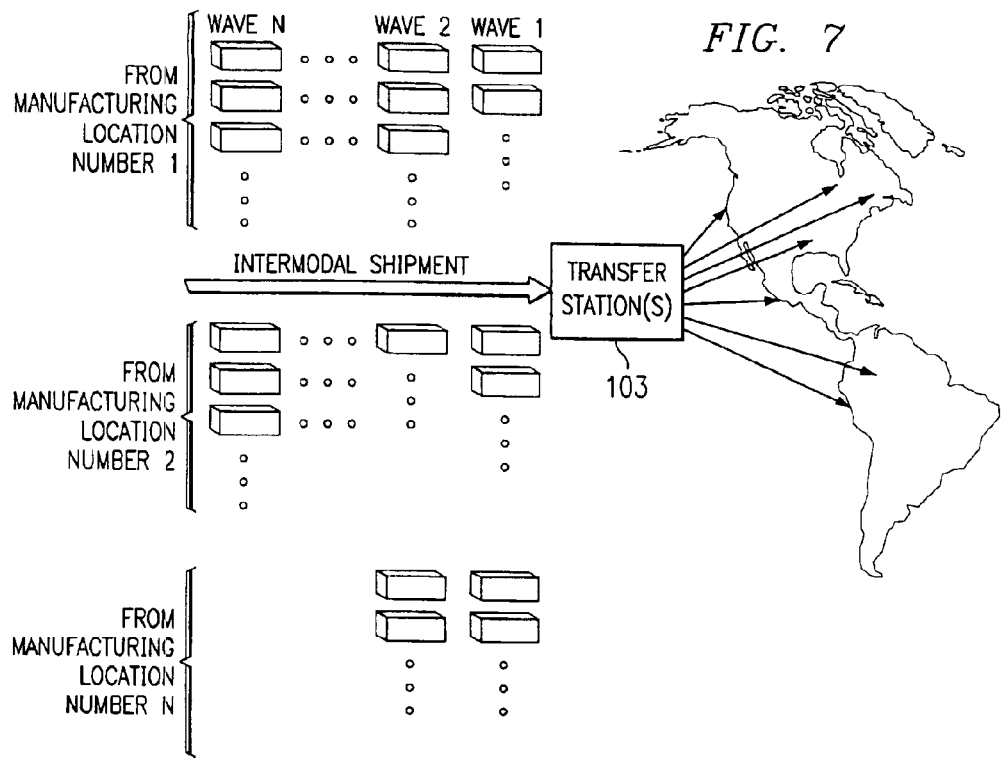
FIG. 7 is a graphic and pictorial representation of the utilization of producer-controlled "containerization" of commodities, nonperishable goods, or articles of manufacture and the utilization of transfer stations to increase distribution and shipping efficiencies and thus to reduce costs.

The savings which can be achieved can be better understood with reference to FIG. 7 which is a simplified block diagram and graphical representation of the improved shipping and delivery method of the present invention. As is shown, shipping containers are organized in "waves" which depart from foreign manufacturing site and are destined for one or more locals which contain numerous consumers or purchasers of the nonperishable goods. FIG. 7 depicts wave 1, wave 2, and wave N. Each wave is carried on a separate boat, aircraft, rail system, or truck system. Wave 1 will arrive prior to wave 2. Likewise, wave 2 will arrive prior to wave N. Each container contains a plurality of disparate and otherwise unrelated items. In the previous figures groupings of bicycles, LCD displays, and tennis rackets were utilized in an example of this type of grouping. Each container is filled as completely as possible in order to maximize the use of the container space. Waves 1, 2, and N depart in separate intermodal shipments from manufacturing locations 1, 2, and N. They are destined for receipt at one or more "transfer stations." Transfer stations are stations which are especially configured to receive and process prepackaged nonperishable articles grouped in waves of shipping containers. The transfer stations may be centralized or regionalized in their location. In the view of FIG. 7, a single transfer station is depicted; although, in alternative embodiments, multiple transfer stations may be utilized. The transfer stations are utilized to further simplify the distribution of goods and route them to the general regions for delivery to the customers. The actual delivery to the customer or to a third party commercial intermediary (such as Mail Boxes Etc.) may be performed by a commercial shipper such as FedEx or UPS. These services should be obtained at a substantial discount due the prepackaging, presorting, and regional grouping of the containers.

Figure 9:
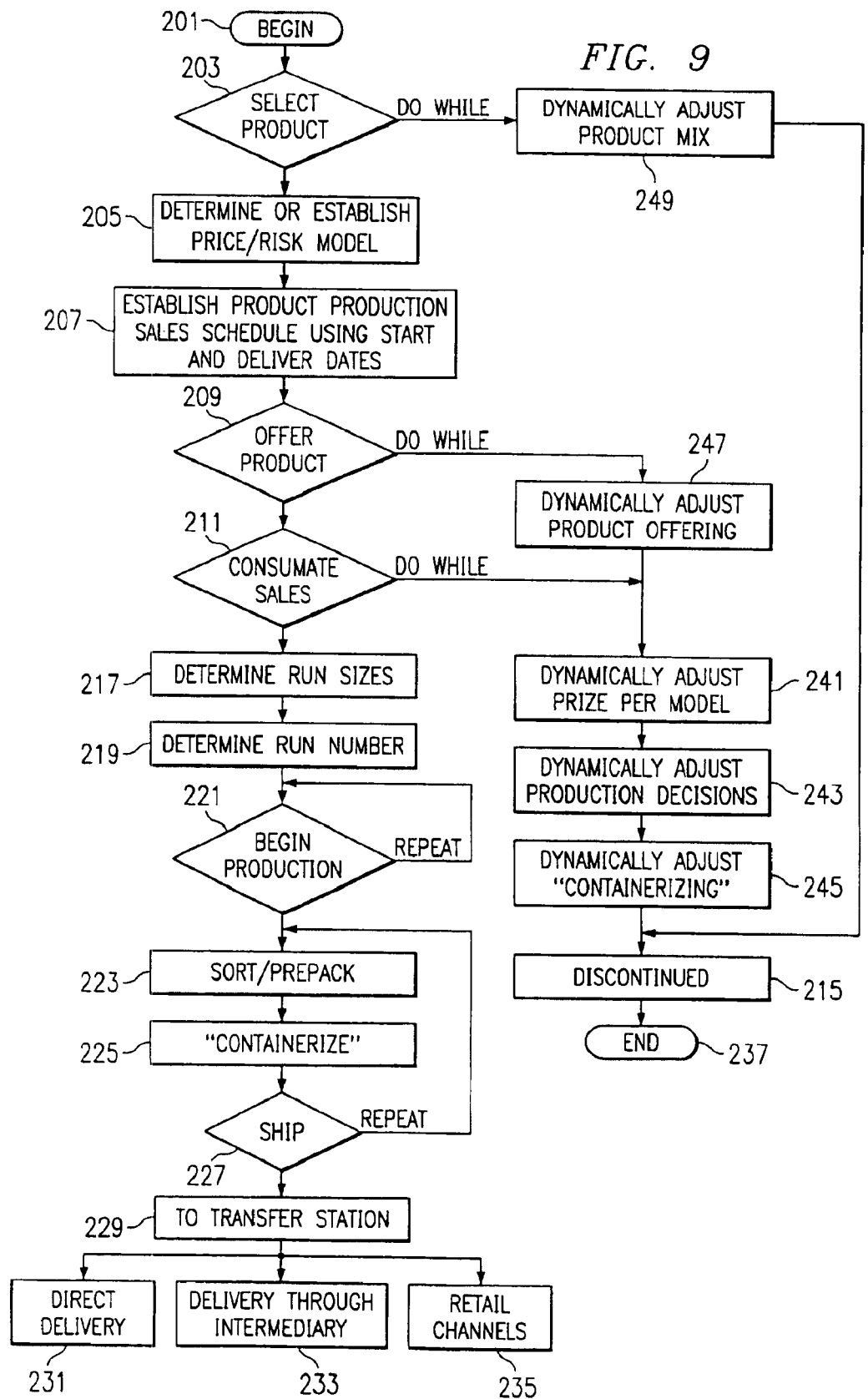
FIG. 9 is a high level flowchart representation of steps utilized in order to accomplish the preferred embodiment of the present invention.

FIG. 9 is a high level and relatively simplified flowchart overview of the improved manufacturing, sales, and distribution system in accordance with the preferred embodiment of the preset invention. The process begins at block 201. In accordance with block 203, a product is selected. In accordance with step 205, the producer or its agent establishes or determines a price/risk model which is associated with the product. This should be an economic model which most accurately models this particular product or product type. The goal is to provide an accurate measure of the investment/risk that the producer has or will have in a particular product. It must be accurate enough so that sales and other commercial commitments can be made based upon the model, and it must include adequate profit for all involved. In accordance with step 207, the producer establishes a product production sales schedule which uses start and delivery dates. In accordance with step 209, the producer offers, over an electronically moderated communication channel, the product for sale. In accordance with step 211, a plurality of customers contact the data processing system which is utilized to offer the products and consummated the plurality of sales.

In accordance with block 217, the producer determines run sizes based upon the existing or anticipated commitments. In accordance with step 219, the producer determines the total number of production runs which are to be made. In accordance with block 221, producer begins production of the products. This process is repeated until all production runs have been completed. In accordance with step 223, the producer sorts and prepacks the already sold products. The producer may also sort and pack products which are not yet sold but which will be either sold in transit or will be sold after delivery to conventional wholesale or retail channels of trade. In other words, a container may be composed of a certain number of items which are "presold" and which have specific end users identified therewith, and specific destinations of delivery. Also, the container may include a great number of packaged but not sold items, which have no specific end destination, but will be either sold in transit or sold in the conventional manner through wholesale and/or resale distribution channels if not sold prior to that time. In accordance with step 225, the sorted and packed items are "containerized" in order to maximize the utilization of containers. In accordance with step 227, the products are shipped (preferably in waves of shipments as discussed above). In accordance with step 229, the products are received at a transfer station or a plurality of transfer stations. At that point, the product may either be routed to retail channels 235 (first passing through wholesale channels), delivered directly to the consumer in accordance with step 231, or delivered to the consumer through an intermediary in accordance with step 233 (utilizing an intermediary such as the post office or Mail Boxes Etc.).

Several "do while" loops are established which iteratively operate throughout the entire process. The first "do while" loop is represented by block 249. In accordance with this step, the product is only one of a relatively large number of products. In accordance with teachings of the present invention, the producer should dynamically adjust the product mixture based upon product interest or actual product sales. In fact, a relatively large "catalog" of products may be maintained.

The next "do while" operation is represented by block 247. In accordance with this block, the product offering is dynamically adjusted. By this we mean the particulars of the product such as size, color, or other user-selectable attributes may be dynamically adjusted during the manufacturing process in direct or indirect response to customer interest in the product, preferably as manifest by advanced purchases of the product. For example, should the data reveal that blue polo shirts are in greater demand than red polo shirts, the manufacturing process can be adjusted dynamically so that successive product runs are utilized to generate a greater number of products which are in high demand and a lesser number of products which are in low demand. The next "do while" operation is represented by blocks 241, 243, and 245. These represent the dynamic adjustment of price per model in accordance with block 241, the dynamic adjustment of production decisions in accordance with block 243, and the dynamic adjustment of containerizing operations in accordance with block 245. One fundamental attribute of the preset invention is that the price will generally match the amount of investment and/or risk that the producer is experiencing at a particular time a sale is consummated and it will include an adequate profit for those involved. This has previously been discussed with reference to exemplary graphs which attempt to represent conceptually the increase or decrease in price, risk, and investment. Additionally, production decisions may be adjusted dynamically in response to weak or strong demand for particular products or product types. Finally, in accordance with block 245, the presorting, prepacking, and containerization operations can be adjusted automatically to take into account a variety of factors including changes in production schedules, changes in actual sales, and changes in consumer demand. These processes are iteratively performed in order to dynamically adjust the manufacturing, selling, and distribution process. The process may be discontinued in accordance with block 215 and ended in accordance with block 237.

Figure 8A:
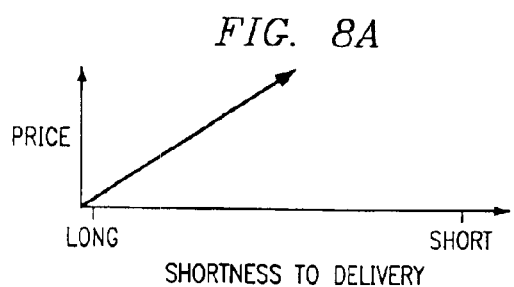
FIGS. 8A is a simple graphical representation of the changes in price with respect to time in accordance with the preferred embodiment of the present invention as contrasted with the prior art of FIG. 8B.
Figure 8B:
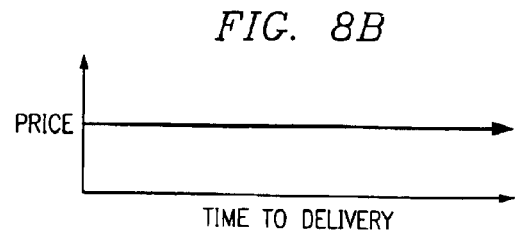
Figure 10:
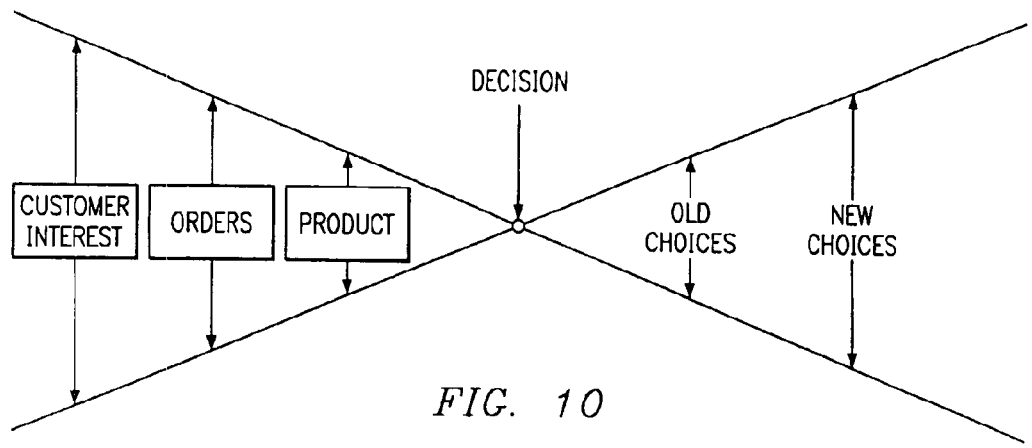
FIG. 10 is a graphical representation of utilization of the present invention to alter product choices and options once production has begun.

Some advantages associated with the preferred embodiment of the preset invention are graphically depicted in FIGS. 8A, 8B, and 10. FIG. 8B is representative of the advantage obtained with the present invention which allows price to be increased as the interval one must wait for delivery decreases. In other words, more patient customers, who make early financial commitments, receive the lowest price. Customers that are reluctant to make financial commitments early in the production process, or who require more immediate delivery, are charged a higher price accordingly. This stands in contrast with the prior art which is represented graphically in FIG. 8B, in which price is relatively invariate with respect to delivery time. In other words, in conventional production, sales, and delivery scenarios, there is little advantage or disadvantage afforded to a customers willingness or unwillingness to wait for particular time intervals to pass before receipt of a product. This is true because the prior art does not allow the consumer to interact with the producer/seller in the early stages of the production cycle. FIG. 10 is a graphical representation of the ability to change product features based on sales data developed from earlier production runs.

Figure 11:
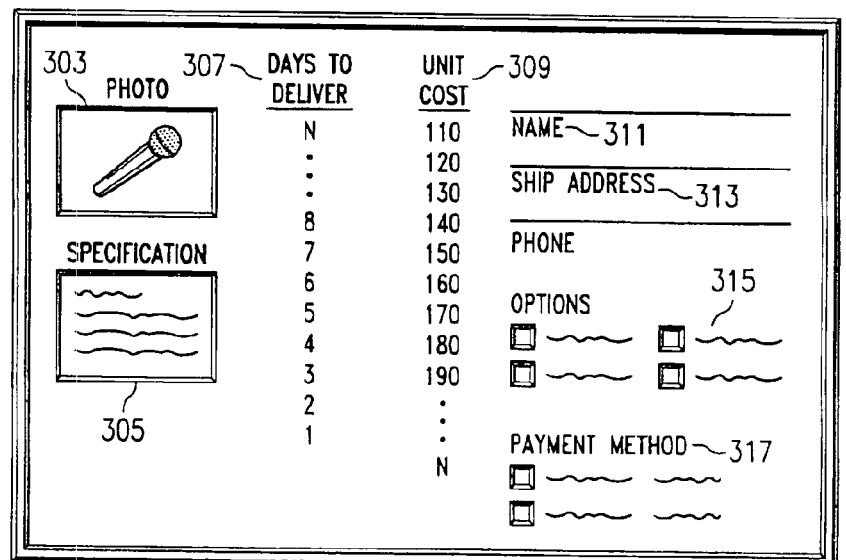
FIG. 11 is a pictorial representation of an exemplary graphical user interface screen utilized to present customers with purchase options in accordance with the preferred embodiment of the present invention.

FIG. 11 is a pictorial representation of an exemplary graphical user interface screen 301 which is utilized to present to customers a particular nonperishable good for sale. In the view of FIG. 11, a tennis racket is depicted in graphical user interface 301. Preferably, a digital image 301 is provided of the product. Additionally, a brief specification 305 is also provided. Additionally, information is provided which maps days-to-deliver data 307 to unit cost data 309. As is shown, the longer the interval time that the potential customer is willing to wait for actual delivery, the lower the per unit cost will be. For example, if the customer can wait seven days for delivery of the tennis racket, the unit cost is $140.00. In contrast, if the customer can only wait two days for delivery, the unit cost is $190.00 per unit. Should the potential customer elect to purchase the racket, the graphical user interface contains templates which allow the user to enter identification information 311, shipping address information 313, select options available for the product, which are represented in options block 315, and establish a method of payment from a list of available payment methods 317.

Figures 12, 13, 14:
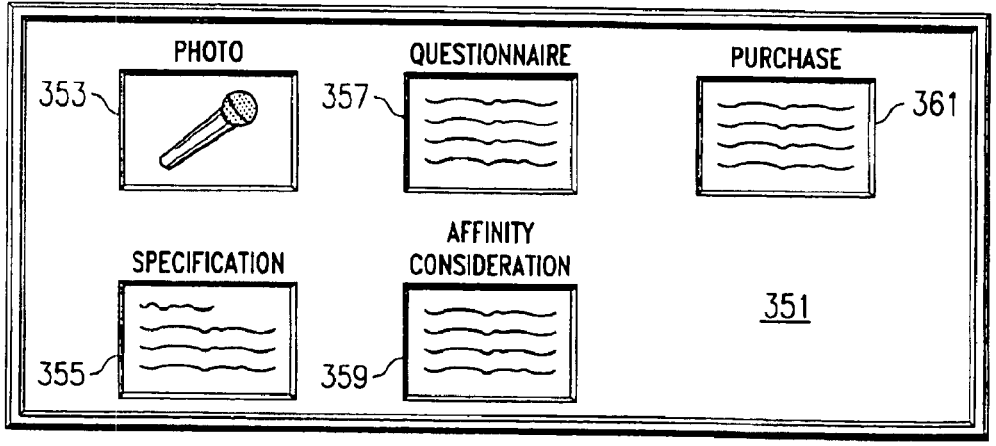
FIGS. 12 and 13 depict alternative methods of price modeling in accordance with the preferred embodiment of the present invention.
FIG. 14 is representative of an exemplary graphical user interface utilized in order to establish potential demand for a proposed product in accordance with the preferred embodiment of the present invention.

The relationship between the days to delivery and unit costs can be relatively complex relationship which takes into account a variety of risks and investment factors. Two exemplary approaches are depicted in the view of FIGS. 12 and 13. FIG. 12 is a representation of the risk/cost analysis which is performed in the form of a tabular calculation. As is shown, the days to delivery data 307 maps to corresponding unit cost information 309. At least these items are made available to the central purchaser in the graphical user interface 301 of FIG. 11. However, further, additional and more complete risk and cost information may be provided to the user in alternative embodiments. For example, such information may include cost of money data 321, risk of obsolence 323, exogenous risk 325, currency risk 327, and factory costs 329. Essentially, the pertinent risk and cost factors can be calculated and provided in a tabular format, in a spread sheet type model, in order to map the purchaser's options to particular price points. An alternative to this approach is depicted in the view of FIG. 13. This is a more formulaic approach, in which a multi-variant equation is established which maps price to a variety of factors, such as manufacturer's cost, the real cost of money in annual percentage points, the number of days of financing which is provided by a prepaid sale, and a variety of other risks related to the product itself, currency fluctuations, and the like. Essentially, the spread sheet approach of FIG. 12 can be supplanted entirely with the formulaic approach such as that depicted in FIG. 13.

Figure 15:
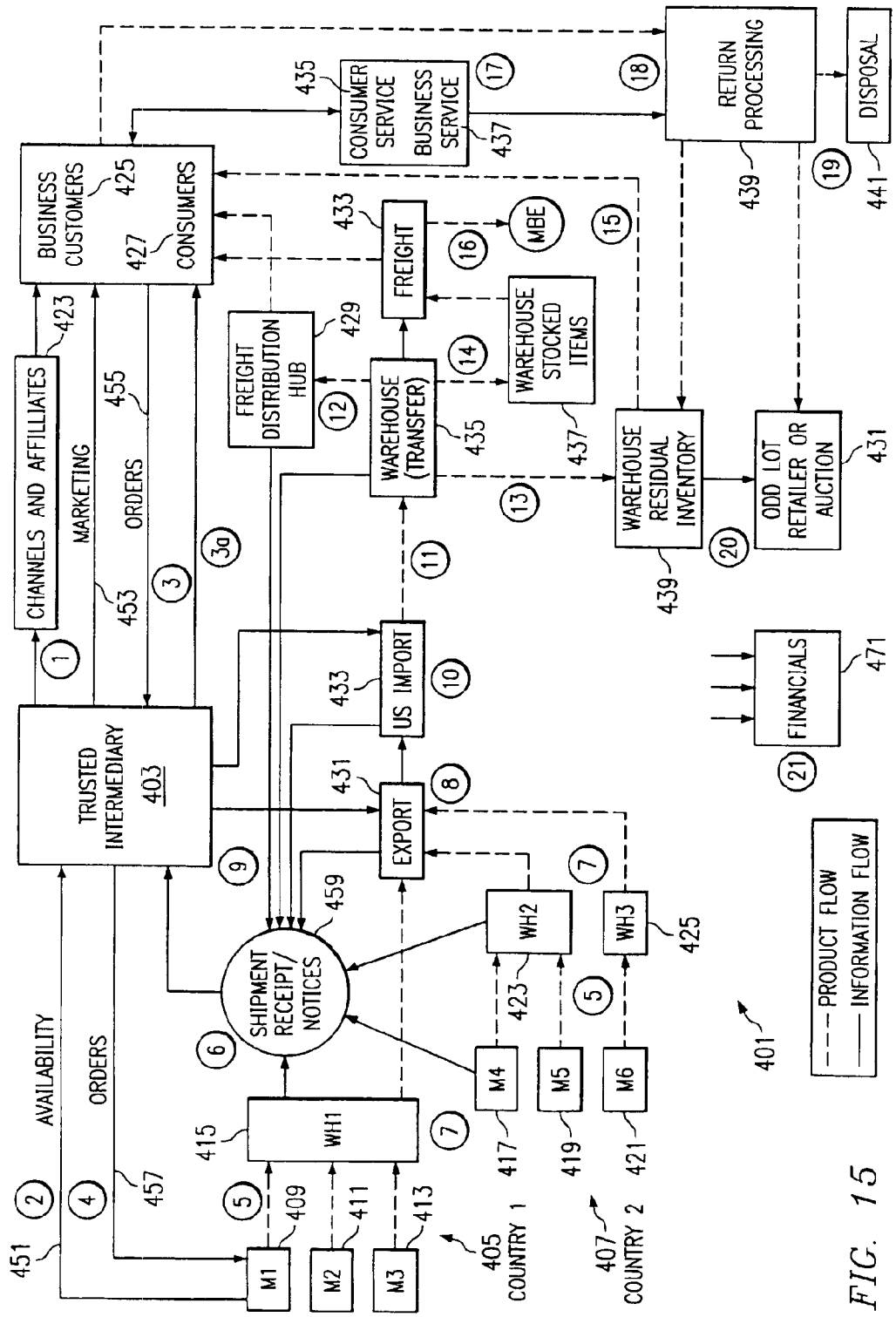
FIG. 15 is a diagram of product and information flow for a business exchange operated in accordance with one embodiment of the present invention.

FIG. 14 is a pictorial representation of a graphical user interface utilized in connection with the demand research model 69 and affinity reward system 75 of FIG. 2. As is shown, a graphical user interface 351 includes a plurality of blocks of information which are useful in determining potential demand for a proposed product. As is shown, a digital photograph 353 is provided of the proposed product (which in this case is the tennis racket, again). Additionally, a brief technical and marketing specification 355 is provided to graphical user interface which describes the product and options available for the product. A questionnaire section 357 is provided which elicits customer opinion regarding the desirability or interest of a particular customer to that product. Once the customer completes the questionnaire information in block 357, he or she may move to the affinity block 359 which provides for monetary or nonmonetary compensation of consideration to the customer for completing the questionnaire information. For example, a "frequent buyer" program may be established in which various points are awarded and accrued which may be redeemed for product purchases or discounts on purchases or for some other unrelated consideration. For example, the affinity consideration block 359 may advise the potential purchaser of a marketing link to a frequent flyer program. For example, the affinity consideration can take the form of an award of frequent flyer miles. Additionally, in the view of FIG. 14, graphical user interface 351 includes a purchase block 361 which is utilized preferably to solicit a financial commitment from the buyer's of the particular product. This differs from an advanced purchase, and represents some relatively de minimus consideration that the potential purchaser will make at this time in order to be notified of product availability and be accorded the lowest optimum most-favored-nation price on a particular product. For example, the purchase data block 361 may elicit a credit card transaction in the amount of $1.00 or $5.00 which will secure the potential purchaser's rights to most-favored-nation pricing in the event that the tennis racket which is depicted in digital photo 353 and described in specification 355 is available for purchase. This may be "dove tailed" with automatic messaging systems such as automatic messaging in Internet, cable, or Web television systems or through one or two way paging systems which notify the potential buyer of product availability. FIG. 15 is a block diagram and flow depiction of one embodiment 410 of the present invention, which shows the flow of product in a dark line and the flow of information in a light line. A trusted intermediary entity 403 is utilized to manage a virtual marketplace which is preferably accessible over the Internet. The trusted intermediary 403 has commercial relationships with both producers of goods and consumers of goods. In particular, this figure represents how the present invention enables business-to-business e-commerce. The process is shown in a series of numbered steps. Each step will be discussed below.

In step number 1, products will be marketed either directly to small businesses 425, or some combination of small businesses 425 and consumers 427. Alternatively, some or all products can be marketed through certain channels and affiliates 423. Marketing information 453 flows from trusted intermediary through a marketing interface. The marketing information is determined or driven by product availability information 451 obtained from a plurality of manufacturers. The trusted intermediary entity 403 operates to qualify or pre-qualify both customers and manufacturers. This is an important function since participation in the "virtual marketplace" or "exchange" depends upon the reliability of the "offers" from manufacturers and the aggregated "acceptances" by the customers. The trusted intermediary entity 403 can obtain production guarantees from the manufacturers and payment promises from the customers. These guarantees can take many forms, and they can have a wide range of legal "enforceability". For example, the payment promise may constitute a charge authorization to a credit card, or simply a check of credit-worthiness sufficient to fulfill the commercial obligation. For large customers, the payment promise may constitute a letter of credit or an escrow deposit of the payment amount. For the manufacturers, the commitment may constitute a performance bond or simply a positive performance history. Once the virtual exchange is perceived by participants as being valuable, the threat of expulsion or exclusion may be sufficient motivation to ensure both payment by buyers and manufacturing by sellers. Also, however it is guaranteed, the order information 451 needs to be reliable. This means that the product needs to conform to the description and specification, and the price and delivery date needs to be firm.

In accordance with step 2, the trusted intermediary entity 403 identify product families and product availability to customers which is determined by product availability and capacities information which is obtained from the manufacturers. In accordance with step 3, the aggregated orders 455 from customers are utilized to as commercial commitments that drive the design, production and/or manufacturing decisions of manufacturers 409, 411, 413, 417, 419, 421, which are located in countries 405, 407. Additionally, in accordance with step number 3a, the customers will be able to track the status of their orders on-line. As discussed above, and in accordance with step 4, the aggregated commercial commitments are in fact treated as purchase orders which thus diminish or eliminate the commercial risk to the manufacturers. The manufacturers may utilize order histories and order patterns form early orders, and thus will be able to develop forcasts for future offerings, and to also better estimate production quantities.

The manufacturers are located proximate warehouses 415, 423, 425 and, in accordance with step number 5 the manufacturers will ship finished product to a local (in-country) warehouses 415,423,425. In the preferred embodiment, the trusted intermediary entity 403 will track production lots, containers, and individual end items throughout the supply chain.

IN accordance with step number 6, the trusted intermediary 403 will receive notification of shipments, receipts, and deliveries from manufacturers, in-country warehouses, and import/export partners U.S. warehouses and freight forwarders at each point in the supply chain. Some of this information may be relayed as product status information to customers via email or through web access to the Internet site.

At the in-country warehouses 415, 423, 425, in accordance with step number 7, workers will label orders for shipment utilizing a preferred, or affiliated shipper such as Untied Parcel Service or Fedex. The items may also be bar coded for identification and tracking purposes. Preferably, workers will sort and aggregate merchandise for shipment according to regions or zones in the consuming country (for example, with UPS/LTL zones). Also appropriate customs documents will be prepared. Then, in accordance with step number 8, the processed products will transported to an appropriate port and processed for export clearance. Preferably, but not necessarily, the activities at the warehouses and export clearance station are performed by the trusted intermediary entity 403 or by someone under its control. In accordance with step number 9, the trusted intermediary entity 403 will continue to take orders for merchandise determined by its supply chain pricing model, and those orders will be allocated against individual items in-transit. Of course, the financial system will capture the selling price of each item and the other order information.

In accordance with step number 10, the shipments are received at a port in the consuming country, and it is processed for clearance though customs. In accordance with step number 11, the shipment is delivered to a warehousing and processing facility, such as a transfer station 423, which has been described above. The prelabeled items will be delivered to a freight distribution hub 429, in accordance with step number 12. For example, the pre-labeled items may be delivered to an LTL/Carrier/ UPS hub in the consuming site and delivered in accordance with the information on the pre-applied label to the end customer.

In accordance with step number 13, items not pre-labeled will be transported to a warehouse location near a port of entry, where pre-sold items will be picked, labeled, and shipped to customers placing orders while the merchandise was in transit. In accordance with step number 14 items which are available for "cross-selling" will be transported to warehouse location 437. In accordance with step number 15, orders will continue to be filled from residual inventory 439 and shipped via the selected delivery service such as UPS until the inventory is depleted or order volumes subside. In some instances, in accordance with step number 16, at a customer's request or if the delivery service is unable to complete delivery, parcels may be directed to local holding networks such as the Mailboxes, Etc or Kinko's networks.

In accordance with step number 17 customer service functions will be performed by a customer service entity 435 or a business service entity 437. Preferably these entities are under the control of trusted intermediary entity 403, but these entities could be independent contractors. Additionally, in accordance with step number 18, a return processing entity 439 can handle return issues. Preferably, returns will be authorized by customer or business service 435, 437 and sent to a central point for processing. In accordance with step number 19 a disposal service 441 will dispose of damaged goods or consign to an odd lot retailer or auctioneer in a refurbished or as-is condition. And in accordance with step number 20, an odd lot retailer or auctioneer 431 may be utilized to sell any residual inventory.

Throughout the entire process, financial system 471 captures appropriate data feeds regarding orders, pricing, inventory, billings, receivables, etc. A key component of 5 such a financial system is an event-triggered pricing matrix with prices determined by the products location or stage of completion, such as: pre-production, production, overseas warehouse, in-transit, in local warehouse, or in-stock. Other and different price points can be utilized.

Figure 16A:
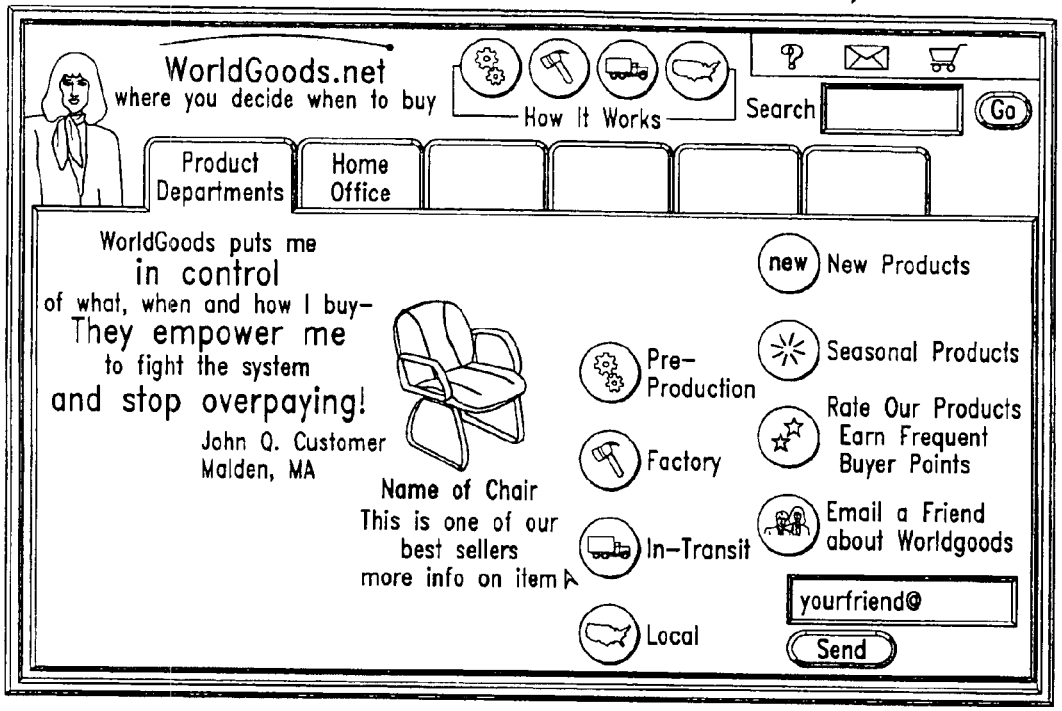
FIGS. 16A and 16B are exemplary internet graphical user interfaces in accordance with one embodiment of the present invention.
Figure 16B:
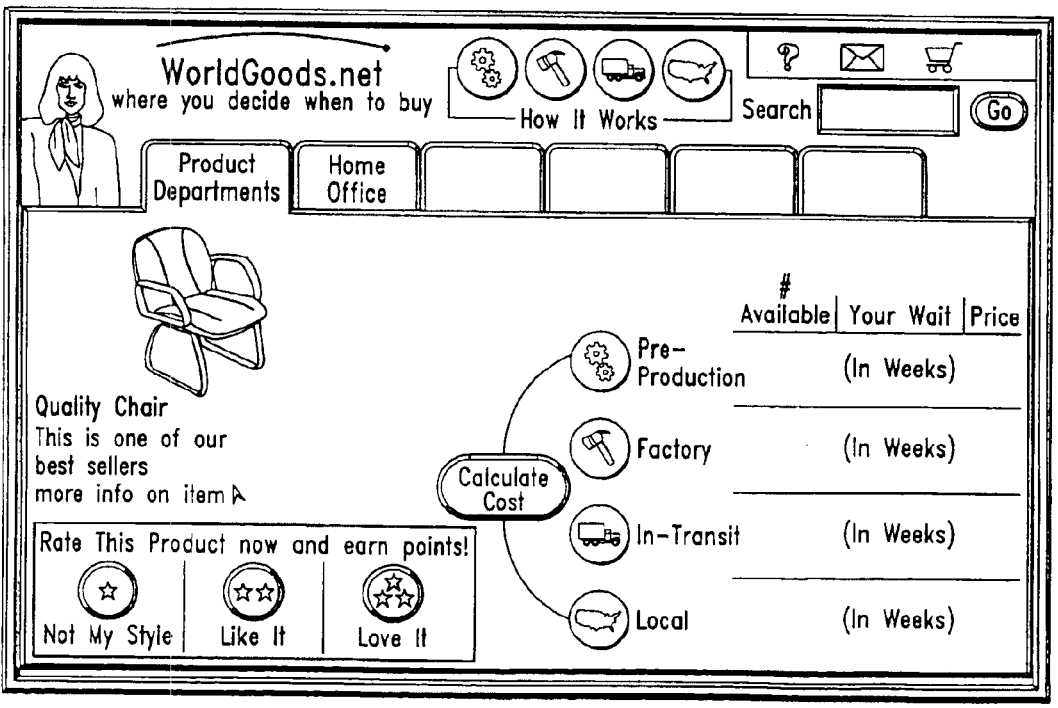

FIGS. 16A and 16B depict some exemplary web pages. In the view of FIG. 16A, a chair is shown which can be purchased in any of a "pre-production" stage, a "factory" stage, an "in-transit" stage, and a "local" stage. Icons are established for each of these stages. In FIG. 16B, an associated (cascading) screen is depicted. For each production stage includes three associated fields: one for the number of units available, one for the amount of time to delivery, and one for the price associated with that stage. This figure additionally depicts an affinity-driven system for providing product feedback, with discrete rating buttons to simplify the response and allow easy aggregation.

FIGS. 17A, B, and C depict an alternative system with only three discrete stages: one for a "production" stage, one for an "in transit" stage, and one for an "in country" or "in store" stage. These web pages represent a number of exemplary pages from what may be a catalog of products. Preferably, the products are grouped by subject matter. A plurality of garden and lawn items are shown. Each product is depicted and/or described. Several fields are associated with each item: a price field for each stage, a quantities available filed, a time to delivery field, an offer expiration date, and an order minimum field. As is shown at each stage the price increases in order to encourage early financial commitments.

Figure 18A:
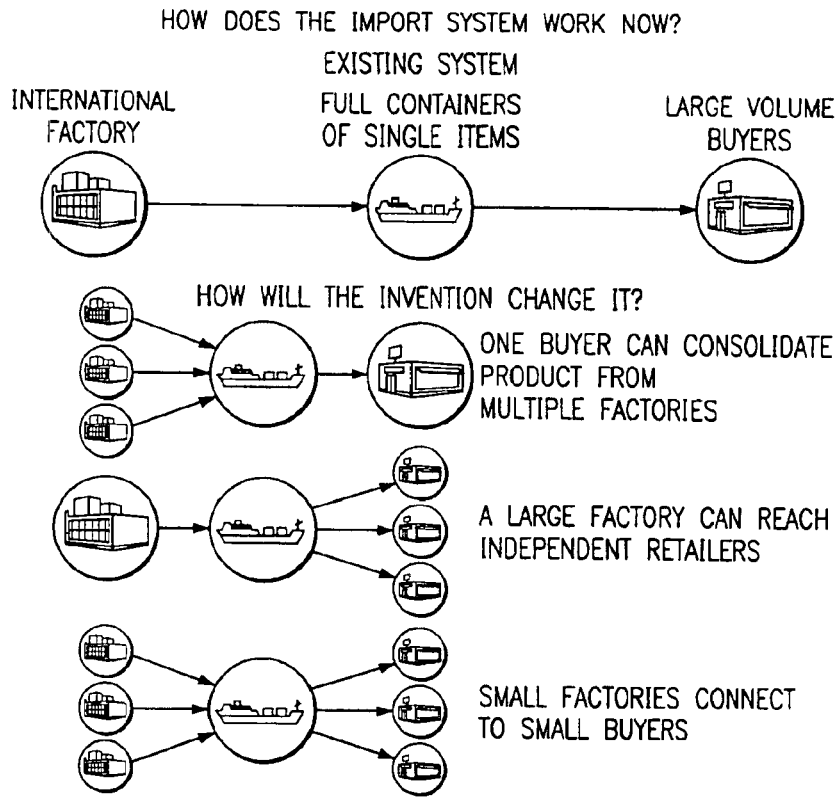
Figure 18B:
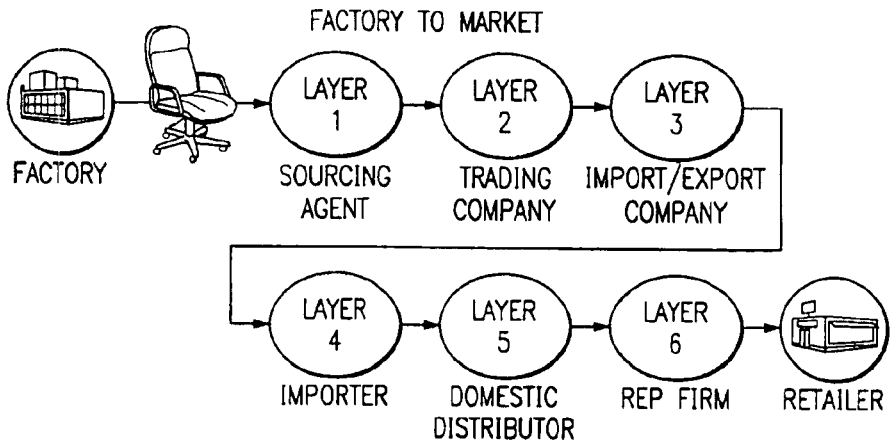
Figure 18E:
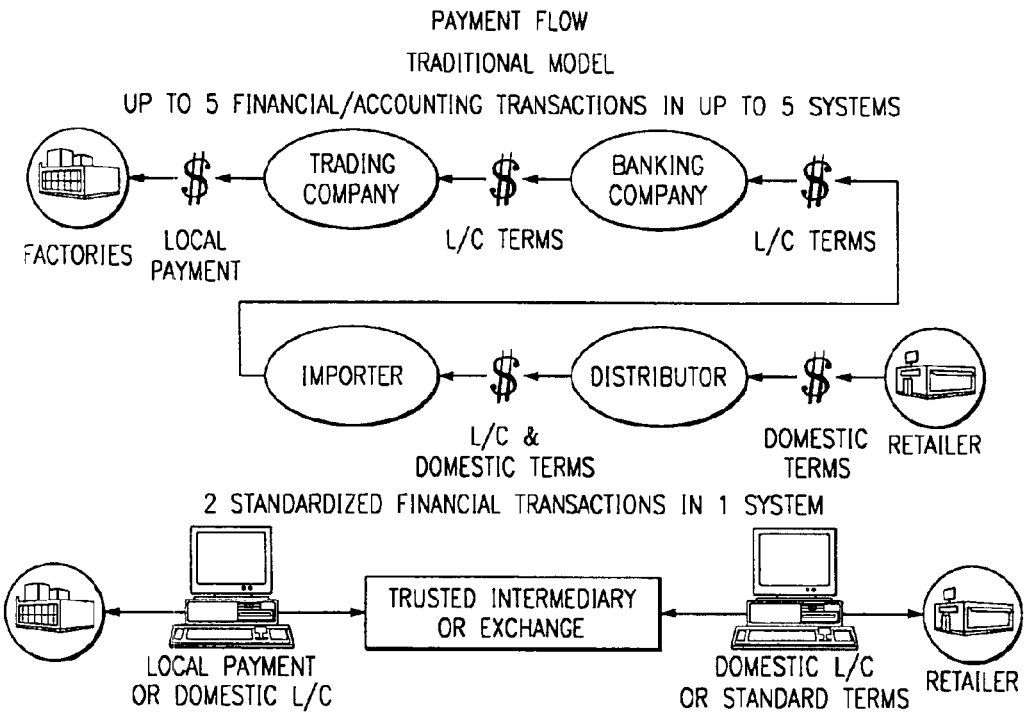
Figure 18F:
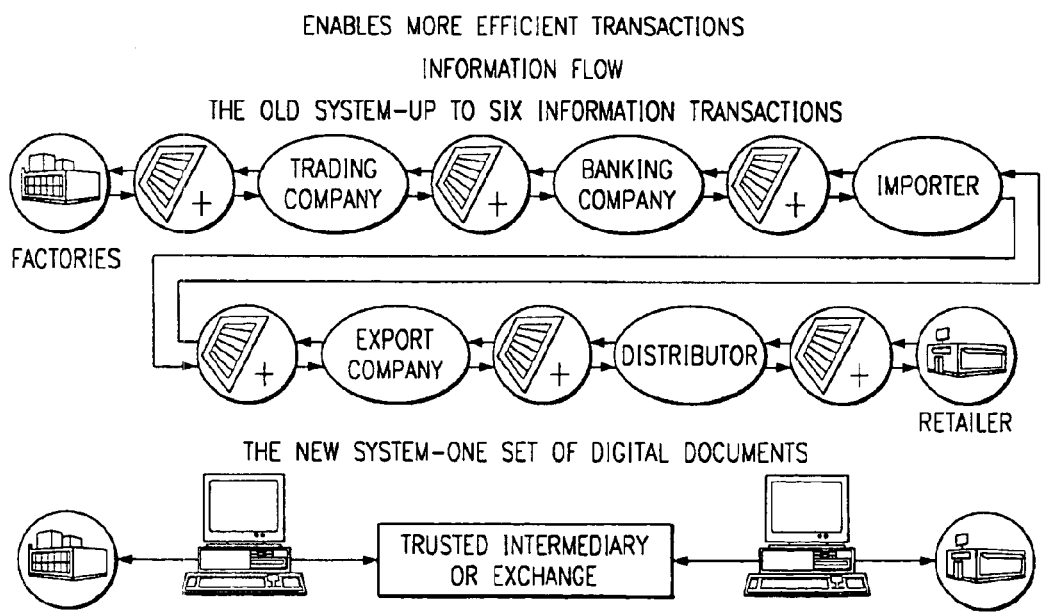

FIGS. 18A through 18F compare the present invention to the prior art, and illustrate the advantages of the present invention. As is shown in FIG. 18A, the prior art import system involves an international factory filling containers with a large number of items same-kind items which are delivered to a large volume buyer for resale. In contrast, the present invention allows one buyer to consolidate product form multiple factories, or a large factory to reach independent retailers, or small factories to connect to small buyers or even individual consumers. As is shown on FIG. 18B, the present invention eliminates multiple layers in an international supply chain, such as sourcing agents, trading companies, import/export companies, importers, domestic distributors, product representation firms, and even retailers. In the prior art as many as six layers may exist between the factory and retailer. As is shown in FIG. 18C, in the prior art, each product category has its own unique path to supply which makes it difficult for independent retailers to source a variety of goods. As such each product category has its own industry references, its own trade shows, and its own agents. The virtual exchange of the present invention allows retailers to enjoy a single point of contact to multiple product categories and multiple factories. The virtual exchange of the present invention also empowers independent retailer purchasing personnel. Independent retailers can now compete in both price and selection with national chains. FIG. 18D depicts the physical flow of goods. In the prior art as many as five shipping transactions and as many as three warehouse stops are required for the distribution, but with the present invention only one or even zero warehouse stops are required. The trusted intermediary entity handles all customs clearance, picking, packing, and shipping activities. FIG. 18E depicts the flow of payments. In a traditional system, up to five financial and/or accounting transactions are required in up to five different systems. In contrast, in the present invention, two standardized transactions are used with one system, as there is only a domestic payment or letter of credit and a foreign payment or letter of credit. FIG. 18F depicts the flow of information. The prior art requires up to six information transactions, while the present invention allows one set of digital documents. It can be appreciated that the present invention provides numerous significant advance over the prior art.

What is claimed is:

1. A method of selling articles of manufacture, comprising:
   (a) providing an electronic communication system which is available to a plurality of potential purchasers of said articles of manufacture;
   (b) utilizing said electronic communication system to identify a plurality of articles of manufacture, from a plurality of manufacturing entities, which are available for purchase by said plurality of potential purchasers;
   (c) for selected ones of said plurality of articles of manufacture which are available for purchase, identifying pricing milestones in each of (1) a manufacturing phase and (2) a distribution phase, which correspond to an increase in commercial risk;
   (d) through prior arrangements with said plurality of manufacturing entities, determining a separate price for each of said pricing milestones to establish a range of prices for said selected ones of said plurality of articles of manufacture, taking into account a change in said commercial risk as said pricing milestones are experienced, and providing a changing price to encourage and reward timely commercial commitments and to reduce the commercial risk to said plurality of manufacturing entities;

(e) utilizing said electronic communication system to make conditional offers of said selected ones of said plurality of articles of manufacture for sale to said plurality of potential purchasers at each of said pricing milestones with said separate price, with said conditional offers specifying at least a minimum number of articles which must be ordered in aggregate before the conditional offer becomes binding upon a manufacturing entity;

(f) utilizing said electronic communication system to separately communicate with particular ones of said plurality of potential purchasers and to aggregate commercial commitments from said plurality of potential purchasers for each of said pricing milestones and thereby selling said selected ones of said plurality of articles of manufacture; and (g) wherein each pricing milestone corresponds to a period of availability In which costs of future supply chain activities or savings related to avoidance of future supply chain activities are reflected in an offer price.

2. A method selling articles of manufacture according to claim 1, wherein said electronic communication system allows simultaneous and mass presentation of said plurality of articles of manufacture.

3. A method of selling articles of manufacture according to claim 2, wherein said electronic communication system comprises at least one of:
 (1) a local area network;
 (2) a wide area network;
 (3) a cable system;
 (4) an internet communication system; and
 (5) a hybrid television and internet communication system.

4. A method of selling articles of manufacture according to claim 2, wherein said electronic communication system comprises an Internet site which may be accessed through the Internet.

5. A method of selling articles of manufacture according to claim 1, wherein said electronic communication system is available to potential purchasers that are pre-qualified as being financially responsible to the extent necessary to fulfill a commitment to purchase said articles of manufacture.

6. A method of selling articles of manufacturer according to claim 1 wherein said potential purchasers comprise resellers of said articles of manufacture which purchase large quantities of said articles of manufacture for resale.

7. A method of selling articles of manufacture according to claim 1 wherein said potential purchasers comprise individual consumers of said articles of manufacture which purchase small quantities of said articles of manufacture for personal use.

8. A method of selling articles of manufacture according to claim 1 wherein said potential purchasers comprise a mixture of:
 (1) resellers of said articles of manufacture which purchase large quantities of said articles of manufacture for resale; and
 (2) individual consumers of said articles of manufacture which purchase small quantities of said articles of manufacture for personal use.

9. A method of selling articles of manufacture according to claim 1, wherein said electronic communication system is utilized to identify said plurality of article of manufacture by providing at least a product specification, quantities available, and a delivery date.

10. A method of selling articles of manufacture according to claim 1, wherein said pricing milestones include certain natural milestones in each of (a) said manufacturing stage and (b) said distribution stage, including at least a plurality of pricing milestones selected from the following list of pricing milestones:
 (1) a design stage for an article of manufacture;
 (2) a pre-production stage for an article of manufacture;
 (3) a production stage for an article of manufacture;
 (4) a packaging stage for an article of manufacture;
 (5) a packing-for-shipment stage for an article of manufacture;
 (6) a shipping stage for an article of manufacture;
 (7) a warehousing stage for an article of manufacture; and
 (8) an in-stock stage for an article of manufacture.

11. A method of selling articles of manufacture, according to claim 1, wherein said articles of manufacture comprise at least one of:
 (1) a durable article;
 (2) a non-perishable article;
 (3) a processed, perishable article;
 (4) a processed commodity.

12. A method of selling articles of manufacture, according to claim 1, wherein said articles of manufacture are manufactured at production sites which are located remotely from said plurality of potential purchasers which are located at a plurality of consumption locations.

13. A method of selling articles of manufacture, according to claim 1, wherein said step of determining a separate price comprises:
 (d) determining a separate price for each of said pricing milestones to establish a series of increasing, discrete prices for said selected ones of said plurality of articles of manufacture, with each discrete price taking into account an increase in said commercial risk as said pricing milestones are experienced, wherein said series of increasing, discrete prices provide a corresponding incrementally decreasing discount in price to encourage and reward early commercial commitments.

14. A method of selling articles of manufacture, according to claim 1, wherein said electronic communications system utilizes a marketing interface to identify said plurality of articles of manufacture which comprises a plurality of cascading user interfaces,
 wherein said marketing interface includes an affinity reward system for soliciting, receiving and rewarding input from said plurality of potential purchasers concerning proposed articles of manufacture, and for aggregating said input.

15. A method of selling articles of manufacture, according to claim 1, wherein said electronic communications system utilizes a marketing interface to identify said plurality of articles of manufacture which comprises a plurality of cascading user interfaces,
 wherein said marketing interface includes a demand research model which solicits, receives, and aggregates interest from said plurality of potential purchasers in proposed articles of manufacture.

16. A method of selling articles of manufacture, according to claim 15, wherein said aggregated input from said plurality of potential purchasers is utilized in making make/don't make decisions for said proposed articles of manufacture.

17. A method of selling articles of manufacture, according to claim 15, wherein said aggregated input from said potential purchasers is provided to potential manufacturers in order to assist them in making make/don't make decisions for said proposed articles of manufacture.

18. A method of selling articles of manufacture, according to claim 15, wherein said aggregated input from said plurality of potential purchasers is provided to potential manufacturers in-part in return for a production guarantee from potential manufacturers.

19. A method of selling articles of manufacture, comprising:
   (a) providing a trusted intermediary entity;
   (b) providing at least one data processing system which is under the control of said trusted intermediary entity and which includes an electronic communication system which is available to a plurality of potential purchasers of said articles of manufacture;
   (c) utilizing said trusted intermediary entity to qualify said plurality of potential purchasers for participation in commercial transactions utilizing said electronic communication system;
   (d) utilizing said trusted intermediary to identify a plurality of articles of manufacture from a plurality of manufacturing entities;
   (e) utilizing said trusted intermediary to negotiate a conditional offer from each of said plurality of manufacturing entities for each of said plurality of articles of manufacture;
   (f) wherein each conditional offer specifies at least one price for each of said plurality of articles of manufacture and a minimum number which must be ordered before said conditional offer becomes binding;
   (g) for selected ones of said plurality of articles of manufacture which are available for purchase, identifying a pricing milestone in each of (1) a manufacturing phase and (2) a distribution phase, which correspond to an increase in commercial risk;
   (h) determining a separate aggregate minimum order number and price for each of said pricing milestones to establish a range of different prices for said selected ones of said plurality of articles of manufacture, taking into account an increase in said commercial risk as said pricing milestones are experienced, and providing a change in price to encourage and reward timely commercial commitments and to reduce the commercial risk for said plurality of manufacturing entities;
   (i) utilizing said electronic communication system to offer said selected ones of said plurality of articles of manufacture for sale to said plurality of potential purchasers at each of said pricing milestones with said separate price; and
   (j) utilizing said electronic communication system to offer said plurality of articles of manufacture for sale in the form of a conditional offer and to separately communicate with particular ones of said plurality of potential purchasers in order to aggregate commercial commitments from said plurality of potential purchasers and to meet said separate aggregate minimum order number for each of said pricing milestones and thereby making said conditional offer binding upon a particular manufacturing entity of a particular one of said plurality of articles of manufacture
   (k) wherein each pricing milestone corresponds to a period of availability in which costs of future supply chain activities or savings related to avoidance of future supply chain activities are reflected in an offer price.

20. A method selling articles of manufacture according to claim 19, wherein said electronic communication system allows simultaneous and mass presentation of said plurality of articles of manufacture.

21. A method of selling articles of manufacture according to claim 20, wherein said electronic communication system comprises at least one of:
   (1) a local area network;
   (2) a wide area network;
   (3) a cable system;
   (4) an internet communication system; and
   (5) a hybrid television and internet communication system.

22. A method of selling articles of manufacture according to claim 19, wherein said electronic communication system comprises an Internet site which may be accessed through the Internet.

23. A method of selling articles of manufacture according to claim 19, wherein said electronic communication system is available to potential purchasers that are pre-qualified by said trusted intermediary entity as being financially responsible to fulfill a commitment to purchase said articles of manufacture.

24. A method of selling articles of manufacturer according to claim 19 wherein said potential purchasers comprise resellers of said articles of manufacture which purchase large quantities of said articles of manufacture for resale.

25. A method of selling articles of manufacture according to claim 19 wherein said potential purchasers comprise individual consumers of said articles of manufacture which purchase small quantities of said articles of manufacture for personal use.

26. A method of selling articles of manufacture according to claim 19 wherein said potential purchasers comprise a mixture of:
   (1) resellers of said articles of manufacture which purchase large quantities of said articles of manufacture for resale; and
   (2) individual consumers of said articles of manufacture which purchase small quantities of said articles of manufacture for personal use.

27. A method of selling articles of manufacture according to claim 19, wherein said electronic communication system is utilized by said trusted intermediary entity to identify said plurality of article of manufacture by providing at least a product specification, quantities available, and a projected delivery date.

28. A method of selling articles of manufacture according to claim 19, wherein said pricing milestones include certain natural milestones in each of (a) said manufacturing stage and (b) said distribution stage, including at least a plurality of pricing milestones selected from the following list of pricing milestones:
   (1) a design stage for an article of manufacture;
   (2) a pre-production stage for an article of manufacture;
   (3) a production stage for an article of manufacture;
   (4) a packaging stage for an article of manufacture;
   (5) a packing-for-shipment stage for an article of manufacture;
   (6) a shipping stage for an article of manufacture;
   (7) a warehousing stage for an article of manufacture; and
   (8) an in-stock stage for an article of manufacture.

29. A method of selling articles of manufacture, according to claim 19, wherein said articles of manufacture comprise at least one of:

(1) a durable article;
(2) a non-perishable article;
(3) a processed, perishable article;
(4) a processed commodity.

30. A method of selling articles of manufacture, according to claim 19, wherein said articles of manufacture are manufactured at production sites which are located remotely from said plurality of potential purchasers which are located at a plurality of consumption locations.

31. A method of selling articles of manufacture, according to claim 19, wherein said step of determining a separate price comprises:
   (f) determining a separate price for each of said plurality of pricing milestones to establish a series of increasing, discrete prices for said selected ones of said plurality of articles of manufacture, with each discrete price taking into account a general increase in said commercial risk as said pricing milestones are experienced, wherein said series of increasing, discrete prices provide a corresponding incrementally decreasing discount in price to encourage and reward early commercial commitments.

32. A method of selling articles of manufacture, according to claim 19, wherein said electronic communications system utilizes a marketing Interface to identify said plurality of articles of manufacture which comprises a plurality of cascading user interfaces,
   wherein said marketing interface includes an affinity reward system for soliciting, receiving and rewarding input from said plurality of potential purchasers concerning proposed articles of manufacture, and for aggregating said input.

33. A method of selling articles of manufacture, according to claim 19, wherein said electronic communications system utilizes a marketing interface to identify said plurality of articles of manufacture which comprises a plurality of cascading user interfaces,
   wherein said marketing interface includes a demand research model which solicits, receives, and aggregates interest from said plurality of potential purchasers in proposed articles of manufacture.

34. A method of selling articles of manufacture, according to claim 33, wherein said aggregated input from said plurality of potential purchasers is utilized in making make/don't make decisions for said proposed articles of manufacture.

35. A method of selling articles of manufacture, according to claim 33, wherein said aggregated input from said potential purchasers is provided to potential manufacturers in order to assist them in making make/don't make decisions for said proposed articles of manufacture.

36. A method of selling articles of manufacture, according to claim 33, wherein said aggregated input from said plurality of potential purchasers is provided to potential manufacturers in-part in return for a production guarantee from potential manufacturers.

37. A method of selling articles of manufacture, comprising:
   (a) providing a trusted intermediary entity;
   (b) providing an virtual exchange which allows for a relatively direct, aggregated, and moderated series of commercial interactions between a plurality of manufacturers of articles of manufacture and a plurality of potential purchasers of said articles of manufacture, which is under control of said trusted intermediary entity;
   (c) providing at least one data processing system which is under the control of said trusted intermediary entity and which includes an electronic communication system which is utilized to enable said virtual exchange and which is available to said plurality of manufacturers of said plurality of articles of manufacture for offering for sale through said virtual exchange said plurality of articles of manufacture and to a plurality of potential purchasers of said plurality of articles of manufacture;
   (d) utilizing said trusted intermediary entity to qualify said plurality of potential purchasers for participation in commercial transactions utilizing said electronic communication system;
   (e) utilizing said trusted intermediary entity to obtain production guarantees from said plurality of manufacturers of said plurality of articles of manufacture, in the form of a conditional offer each of which is binding upon said plurality of manufacturers if an aggregate minimum number of orders is obtained in a predetermined amount of time;
   (f) utilizing said electronic communication system of said virtual exchange to identify a plurality of articles of manufacture which are available for purchase by said plurality of potential purchasers through said virtual exchange;
   (g) for selected ones of said plurality of articles of manufacture which are available for purchase, identifying pricing milestone in each of (1) a manufacturing phase and (2) a distribution phase, which correspond generally to an increase in commercial risk;
   (h) determining a separate price for each of said plurality of pricing milestones to establish a range of changing prices for said selected ones of said plurality of articles of manufacture, taking into account a change in said commercial risk experienced by said plurality of manufacturers of said selected ones of said plurality of articles of manufacture as said pricing milestones are experienced, and providing a changing price to said plurality of potential purchasers to encourage and reward early commercial commitments and to reduce commercial risk to said plurality of manufacturers;
   (i) utilizing said electronic communication system of said virtual exchange to offer said selected ones of said plurality of articles of manufacture for sale to said plurality of potential purchasers at each of said plurality of pricing milestones with said separate price;
   (j) utilizing said electronic communication system of said virtual exchange to separately communicate with particular ones of said plurality of potential purchasers and to aggregate commercial commitments from said particular ones of said plurality of potential purchasers for each of said pricing milestones in order to meet said aggregate minimum number of orders for said selected ones of said plurality of articles of manufacture; and
   (k) wherein each pricing milestone corresponds to a period of availability in which costs of future supply chain activities or savings related to avoidance of future supply chain activities are reflected in an offer price.

38. A method selling articles of manufacture according to claim 37, wherein said electronic communication system allows simultaneous and mass presentation of said plurality of articles of manufacture.

39. A method of selling articles of manufacture according to claim 37, wherein said electronic communication system comprises at least one of:

(1) a local area network;

(2) a wide area network;

(3) a cable system;

(4) an internet communication system; and (5) a hybrid television and internet communication system.

40. A method of selling articles of manufacture according to claim 37, wherein said electronic communication system comprises an internet site which may be accessed through the Internet.

41. A method of selling articles of manufacture according to claim 37, wherein said electronic communication system is available to potential purchasers that are pre-qualified as being financially responsible to the extent necessary to fulfill a commitment to purchase said articles of manufacture.

42. A method of selling articles of manufacturer according to claim 37 wherein said potential purchasers comprise resellers of said articles of manufacture which purchase large quantities of said articles of manufacture for resale.

43. A method of selling articles of manufacture according to claim 37 wherein said potential purchasers comprise individual consumers of said articles of manufacture which purchase small quantities of said articles of manufacture for personal use.

44. A method of selling articles of manufacture according to claim 37 wherein said potential purchasers comprise a mixture of:

(1) resellers of said articles of manufacture which purchase large quantities of said articles of manufacture for resale; and (2) individual consumers of said articles of manufacture which purchase small quantities of said articles of manufacture for personal use.

45. A method of selling articles of manufacture according to claim 37, wherein said electronic communication system is utilized to identify said plurality of article of manufacture by providing at least a product specification, quantities available, and a projected delivery date.

46. A method of selling articles of manufacture according to claim 37, wherein said pricing milestones include certain natural milestones in each of (a) said manufacturing stage and (b) said distribution stage, including at least a plurality of pricing milestones selected from the following list of pricing milestones:

(1) a design stage for an article of manufacture;

(2) a pre-production stage for an article of manufacture;

(3) a production stage for an article of manufacture;

(4) a packaging stage for an article of manufacture;

(5) a packing-for-shipment stage for an article of manufacture;

(6) a shipping stage for an article of manufacture;

(7) a warehousing stage for an article of manufacture; and (8) an in-stock stage for an article of manufacture.

47. A method of selling articles of manufacture, according to claim 37, wherein said articles of manufacture comprise at least one of:

(1) a durable article;

(2) a non-perishable article;

(3) a processed, perishable article;

(4) a processed commodity.

48. A method of selling articles of manufacture, according to claim 37, wherein said articles of manufacture are manufactured at production sites which are located remotely from said plurality of potential purchasers which are located at a plurality of consumption locations.

49. A method of selling articles of manufacture, according to claim 37, wherein said step of determining a separate price comprises:

(h) determining a separate price for each of said plurality of pricing milestones to establish a series of increasing, discrete prices for said selected ones of said plurality of articles of manufacture, with each discrete price taking into account a general increase in said commercial risk to said plurality of manufacturers of said selected ones of said plurality of articles of manufacture as said pricing milestones are experienced, wherein said series of increasing, discrete prices provide a corresponding incrementally decreasing discount in price to said plurality of potential purchasers to encourage and reward early commercial commitments.

50. A method of selling articles of manufacture, according to claim 37, wherein said electronic communications system utilizes a marketing interface to identify said plurality of articles of manufacture which comprises a plurality of cascading user interfaces, wherein said marketing interface includes an affinity reward system for soliciting, receiving and rewarding input from said plurality of potential purchasers concerning proposed articles of manufacture, and for aggregating said input.

51. A method of selling articles of manufacture, according to claim 37, wherein said electronic communications system utilizes a marketing interface to identify said plurality of articles of manufacture which comprises a plurality of cascading user interfaces, wherein said marketing interface includes a demand research model which solicits, receives, and aggregates interest from said plurality of potential purchasers in proposed articles of manufacture.

52. A method of selling articles of manufacture, according to claim 51, wherein said aggregated input from said plurality of potential purchasers is utilized by said plurality of manufacturers in making make/don't make decisions for said proposed articles of manufacture.

53. A method of selling articles of manufacture, according to claim 51, wherein said aggregated input from said plurality of potential purchasers is provided to potential manufacturers in-part in return for a production guarantee from potential manufacturers.

\* \* \* \* \*